US007620536B2

(12) United States Patent
Chow

(10) Patent No.: US 7,620,536 B2
(45) Date of Patent: Nov. 17, 2009

(54) SIMULATION TECHNIQUES

(75) Inventor: Peter Chow, Kent (GB)

(73) Assignee: Fujitsu Limited, Kawasaki (JP)

( * ) Notice: Subject to any disclaimer, the term of this patent is extended or adjusted under 35 U.S.C. 154(b) by 574 days.

(21) Appl. No.: 11/181,804

(22) Filed: Jul. 15, 2005

(65) Prior Publication Data
US 2006/0015306 A1 Jan. 19, 2006

(30) Foreign Application Priority Data
Jul. 15, 2004 (EP) .................. 04254245
May 26, 2005 (EP) .................. 05253256

(51) Int. Cl.
*G06F 17/50* (2006.01)
(52) U.S. Cl. .............. 703/13; 703/10; 702/66
(58) Field of Classification Search ........... 703/2, 703/13, 3, 10, 14; 702/66, 65, 17; 367/38; 343/700; 435/461; 324/300; 600/430
See application file for complete search history.

(56) References Cited

U.S. PATENT DOCUMENTS

| | | | | |
|---|---|---|---|---|
| 4,611,312 | A * | 9/1986 | Ikeda ...................... | 367/38 |
| 6,996,470 | B2 * | 2/2006 | Kamps .................... | 702/17 |
| 7,124,069 | B2 * | 10/2006 | Meuris et al. ............. | 703/13 |
| 2002/0099510 | A1 * | 7/2002 | Namiki .................... | 702/66 |
| 2003/0023417 | A1 * | 1/2003 | Chen et al. ............... | 703/3 |
| 2003/0050760 | A1 * | 3/2003 | Namiki .................... | 702/66 |
| 2003/0088180 | A1 * | 5/2003 | Van Veen et al. .......... | 600/430 |
| 2003/0170898 | A1 * | 9/2003 | Gundersen et al. ........ | 435/461 |
| 2003/0197647 | A1 * | 10/2003 | Waterman ................ | 343/700 MS |
| 2003/0204343 | A1 * | 10/2003 | Yamamoto et al. ........ | 702/65 |
| 2004/0176937 | A1 * | 9/2004 | Jenny et al. .............. | 703/10 |
| 2006/0125475 | A1 * | 6/2006 | Sodickson et al. ........ | 324/300 |

OTHER PUBLICATIONS

Collino F et al: "A space-time mesh refinement method for ID Maxwell's system" Comptes Rendus Des Seances De L'Academie Des Sciences, Serie I: Mathematiques, Editions Scientifiques & Medicales Elsevier, FR, vol. 328, No. 3, Feb. 1999, pp. 263-268, XP004267581, ISSN: 0764-4442, the whole document.

Rantakokko J: "Partitioning strategies for structured multiblock grids", Parallel Computing, Elsevier Publishers, Amsterdam, NL, vol. 26, No. 12, Nov. 2000, pp. 1661-1680, XP004217061, ISSN: 0167-8191 the whole document.

(Continued)

*Primary Examiner*—Paul L Rodriguez
*Assistant Examiner*—Kandasamy Thangavelu
(74) *Attorney, Agent, or Firm*—Staas & Halsey LLP

(57) ABSTRACT

The application describes various techniques for improving the accuracy and numerical stability of computer-implemented simulations which employ subgridding techniques. In particular, techniques are described in which information is transferred across a common interface between two neighboring fine-grids. Furthermore, techniques are also described in which, during the update of a grid in regions where there exists an embedded fine-grid, the field values at co-located edges at which fine-grid solution points exist on the grid, are summed and used in an approximation of the gradient term required for the FD-TD updating stencils to perform an electromagnetic simulation.

40 Claims, 16 Drawing Sheets

OTHER PUBLICATIONS

Vuik C et al: "Coarse grid acceleration of a parallel block preconditioner" Future Generations Computer Systems, Elsevier Science Publishers, Amsterdam, NL, vol. 17, No. 8, Jun. 2001, pp. 933-940, XP004249780,ISSN: 0167-739X, the whole document.

XP022530052, Luchini, An Adaptive-mesh finite-difference solution method for Navier-Stokes equations, Journal of Computational Physics, Feb. 1, 1987, London, GB.

European Examination Report issued on Jan. 22, 2009 in corresponding European Patent Application 05 253 256.1.

* cited by examiner

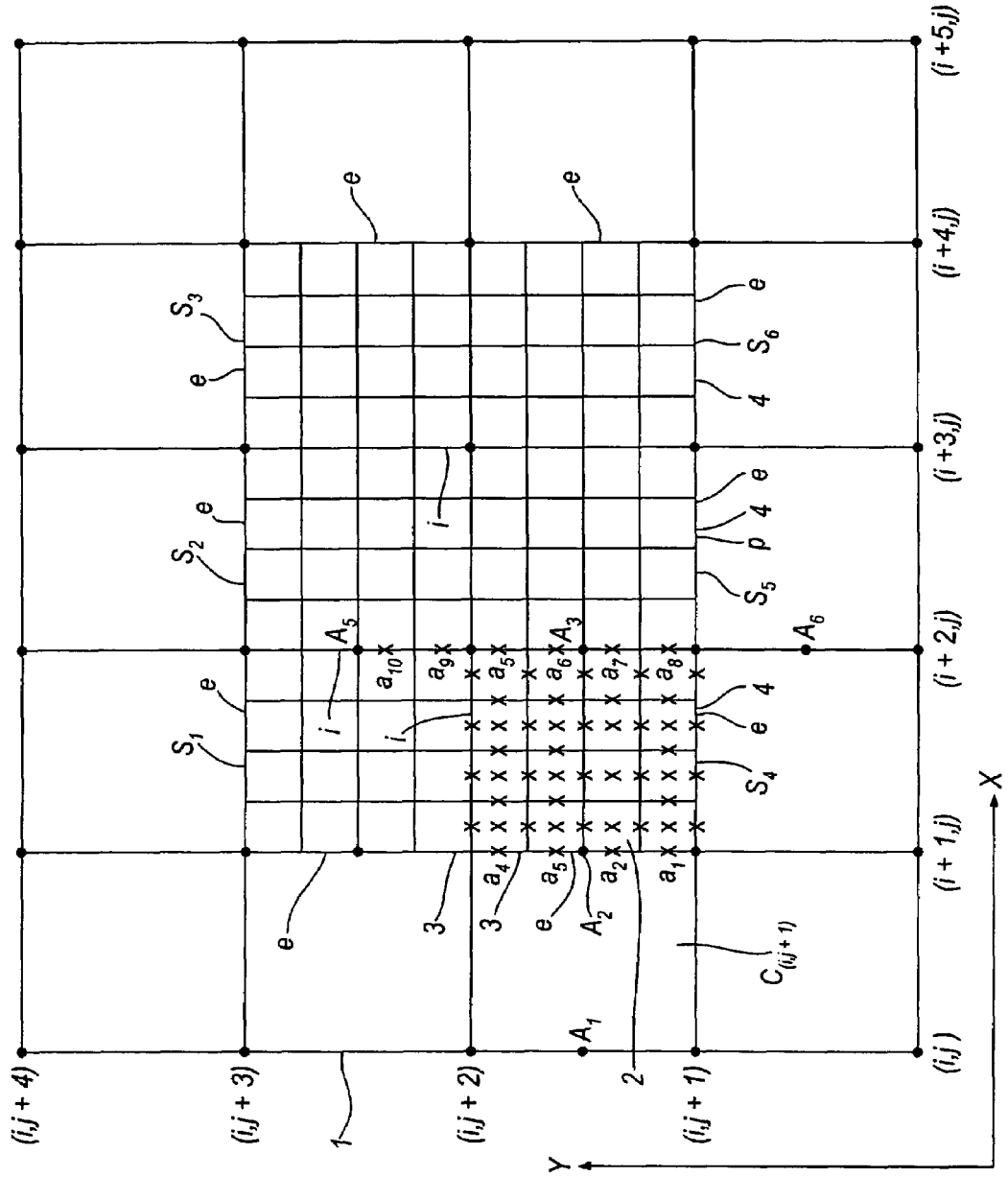

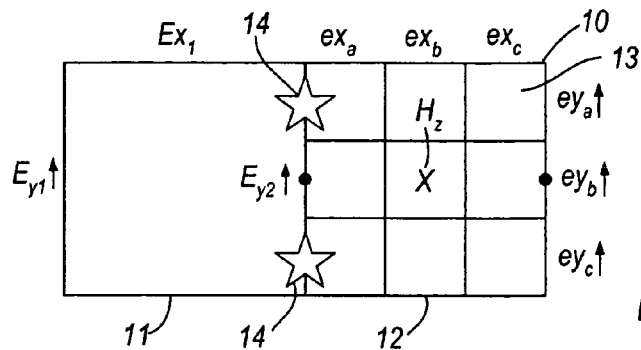

Multi-Level Grids Procedure
E-field Coupling Version

SIMULATION TECHNIQUES

The present invention relates to computer-implemented techniques for the numerical approximation of a system to be simulated and, particularly, to the analysis of electromagnetic fields using such techniques. The present invention finds particular, but not exclusive, application to the analysis of electromagnetic fields using the FD-TD (Finite-Difference Time-Domain) technique to solve the Maxwell Equations and thus to simulate and forecast the dynamics of electromagnetic wave propagation for a given environment and conditions.

There is an ever increasing need to simulate and consider the effect of a wide variety of wave phenomena, such as electromagnetic wave propagation, arising in a variety of environments. Being able to simulate, for example, the dynamics of fluid propagation, heat transfer or electromagnetic radiation is highly advantageous in a number of industries. In particular, electromagnetic field simulation plays an important role in the design and development of electronic products. In this rapidly-changing technology, the time taken in bringing a product to the market place can be critical in maintaining a commercial advantage. In this regard, electromagnetic simulation can provide a highly advantageous tool for design engineers in advancing the development of a device. It may be used, for example, to approximate the surface currents and interior fields arising in complex electronic objects. Electromagnetic simulation is also employed to analyse the electromagnetic radiation emitted by electronic devices, particularly mobile communication devices, in order to assess the health and safety issues for these devices. Furthermore, the study of electromagnetic scattering plays a central role in the design of many complex structures, such as aircrafts, in order to optimise the design and shape of a structure surface. The simulation of convective heat transfer is a useful aid in the analysis and development of ventilation (cooling and/or heating) systems such as those employed in electronic devices. It also provides a tool suitable for use in fire simulation methods which seek to consider the potential fire hazards arising in the electronics industry and other industries.

Generally speaking, the main steps involved in any modelling process are:

1) To define the geometry of a system (i.e. structure or environment) under consideration on a structured grid, taking into account the need to impose boundary conditions on the finite grid as well as the material properties (eg, for electromagnetic modelling, the magnetic permittivity $\epsilon$, the magnetic permeability $\mu$, and the electric conductivity $\sigma$ should be defined);
2) To calculate the numerical solutions for the physical phenomenon under consideration at each node within the grid at a given instant in time; and
3) To provide means for visualising and potentially manipulating the solutions obtained at each time step of the calculation.

A well-known scheme which finds use in such modelling methods is the FD-TD scheme. It was first proposed by Yee in 1966 and is used in a number of computational simulation tools for analysing the behaviour of electromagnetic propagation within a one-, two-, or three-dimensional domain. Broadly speaking, the scheme employs a finite difference and finite time domain approach to discretise the differential form of Maxwell's equations. By this method, derivatives of the electric and magnetic field variables required by Maxwell's equations are approximated by spatial finite differences and the calculation then proceeds in a series of time steps.

In accordance with the FD-TD technique, the computational domain or "space", in which the simulation will be performed, is represented by a Cartesian grid, discretised in both time and space, comprising a plurality of cells in one, two or three dimensions. FIG. 4 shows a three-dimensional cell, each point of the cell being represented by a set of integers (i, j, k), where i, j and k are grid coordinate numbers in the x-axis, y-axis and z-axis directions respectively. Each of the cells comprises a number of solution points or nodes for the electric and magnetic fields at a given instant in time. In this illustration, the electric field components are defined on the cell faces and the magnetic field components are defined on the cell edges. In accordance with the FD-TD principle, the electric field is therefore staggered both spatially and temporally from the magnetic field.

As with any explicit numerical modelling technique, which employs a grid structure for the computational domain, there exists a restriction on the time step $\Delta t$ with respect to the cell size to ensure stability. Within the FD-TD scheme this is given by:

$$(1) - \Delta t \leq \left( v \sqrt{\frac{1}{(\Delta x)^2} + \frac{1}{(\Delta y)^2} + \frac{1}{(\Delta z)^2}} \right)^{-1}$$

where $v$ is the speed of light in free space.

This stability condition, known as the Courant-Friedrichs-Lewy (CFL) condition, imposes a restriction on the size of the time step $\Delta t$ in relation to the cell dimensions of the grid.

In many instances, the object or environment to be modelled exhibits so-called inhomogeneities, such as complex or small-scale geometry, or curved boundaries. In order to accurately simulate and consider the effect of these inhomogeneities, the computational domain should preferably allow the numerical solution procedure to capture different levels of detail throughout the system. Analysing electromagnetic fields using a grid which cannot adequately resolve intricate or small-scale structures leads to an inaccurate simulation which, in many applications, can have critical consequences. Obtaining a model of insufficient accuracy is particularly unacceptable in applications where human safety is being investigated, for example analysing the effect of electromagnetic radiation from mobile communication devices on the human body. Furthermore, in complex multi-dimensional situations, for example when trying to simulate and forecast the electromagnetic dynamics for a complex object, such as a laptop computer, it is necessary to be able to resolve and precisely represent the electromagnetic interactions arising within the laptop at component level.

Thus, it is apparent that the grid dimensions ($\Delta x$, $\Delta y$, $\Delta z$) employed in any gridded domain for simulation must be small enough to accurately represent the smallest feature in the model. Naturally, fine geometric features require fine grid cells for precise representation and thus, where a uniform Cartesian grid is employed throughout the domain (i.e. a rectangular grid in which $\Delta x = \Delta y = \Delta z$ for 3-dimensions), any spatial refinement needed to resolve small details leads to a global refinement of the computational grid dimensions. Similarly, the simulation of any wave phenomenon varying at a high frequency requires fine grid cells to accurately represent the propagation of the wave with time. If the, or a part of the, object under consideration is a small-scale or complex geometrical structure, such as a wire, it is clear that a fine grid is required to accurately model, for example, the field arising in the vicinity of the wire when an electric current is passed through the wire. Similarly, the errors that arise when modelling curved surfaces, due to the way in which they are staircased to fit into the Cartesian grid, can be alleviated by employing a higher level of grid refinement.

Thus, to attain accuracy, fine grid cells are essential. An obvious consequence of the need to use fine grid cells in a uniform computational grid is an increase in the number of cells, and thus solution points, in the model. This in turn leads to a higher computing cost in terms of both memory and calculation time. In the example of FD-TD schemes, the problem is further compounded by the CFL stability condition which bounds the time step $\Delta t$ in relation to the grid size so that the finer the grid cell, the smaller the time step $\Delta t$, thus further increasing the calculation workload. Software tools developed to analyse three-dimensional, highly intricate, high frequency models therefore require substantial computing resources in the form of a large memory and high-processing-power central processing units to conduct a simulation that takes a considerable time to run.

Parallel processing, in which the grid is partitioned amongst the processing elements available for a collective computation to attain the solution, offers one means by which the calculation time of a numerical approximation can be reduced. However, this approach is often not cost effective, particularly in complex situations, since any advantage gained in the reduction of the calculation time may be countered by the considerable cost of adding the extra processing elements.

Rather than dividing the entire computational domain into a grid of fine cells it is known to employ a coarse-grid globally over the domain and then to apply one or more fine-grids, each fine-grid having a plurality of fine-grid cells in regions where they are needed. A domain comprising a coarse-grid and having an embedded fine-grid is shown in FIGS. 1A and 1B. The term "coarse-grid" should be interpreted as meaning a grid applied to the whole domain and having the lowest level of refinement. This technique, known as subgridding, can therefore reduce the computational resource requirement by intelligently embedding fine grids locally in regions where they are needed within a coarse-grid model in order to resolve small-scale structures or to improve the modelling of curved boundaries. The savings in both memory and calculation time can be substantial, yet the technique substantially upholds the solution accuracy to that attained by a fine-grid model.

Despite the significant computational advantages that can be achieved by this technique, which circumvents the need to use a very small time step throughout the whole computational domain, subgridding methods are not commonly applied, at least in FD-TD, primarily due to numerical instabilities arising at an interface between the coarse and fine-grids. The numerical instability arises as a consequence of the discontinuity in the number of solution points at the interface between the coarse-grid and the fine-grid. In particular, errors are introduced by the temporal and spatial interpolation required to convey information at the interface between the two grids. In previously considered subgridding techniques, it is usual for a solution to be firstly obtained for the coarse-grid at a given instant in time. The solution points of the fine-grid cells within a fine-grid are then updated from the appropriate interface between the coarse and the fine-grid following interpolation methods which "fill in" the missing fine grid values. It can be seen therefore that the necessary use of interpolation leads to the introduction of numerical errors at every interface between grids of different refinement level within a computational domain each time the solution is updated.

In the case of the domain shown in FIG. 1A, the fine-grid is defined as comprising a region of fine-grid cells embedded within nine coarse-grid cells. Thus, the perimeter of the fine-grid forms the interface between the coarse-grid and the fine-grid. The fine-grid may alternatively be defined, for example, as being the region of fine-grid cells embedded within a single coarse-cell. In this case the domain shown in FIG. 1A could be said to comprise a coarse-grid having nine neighbouring fine-grids. Again, the perimeter of each fine-grid, which is also the perimeter of a single coarse-cell, defines an interface between the coarse-grid and the fine-grid. If a fine-grid adjoins one or more other fine-grids there will exist a so-called common interface between each of the neighbouring fine-grids. It should therefore be appreciated that the number of "interfaces" between two grids of different refinement level, and the positions of these interfaces, depends upon how the perimeter of the grid of higher refinement level is defined. Clearly, the use of a plurality of fine-grids of relatively small dimension within a computational domain leads to more errors being introduced due to the interpolation needed at every interface.

Accordingly, it is desirable to improve the accuracy of solutions obtained at solution points of embedded or fine-grids.

According to a first aspect of the present invention, there is provided a computer-implemented method for obtaining a numerical approximation of a physical system to be simulated, the method utilising a computational domain comprising a coarse-grid, having a plurality of coarse-grid cells, and a two or more neighbouring primary level fine-grids having a plurality of primary level fine-grid cells of refinement integer k, wherein each of the coarse-grid cells and fine-grid cells has one or more solution points at which values representing a physical quantity of the physical system to be simulated may be obtained, wherein a calculation procedure is performed in order to obtain a value for at least one solution point of every cell at a given stage in time and wherein, during the calculation procedure, new values at primary level fine-grid cell solution points at an interface between the coarse-grid and the primary level fine-grid which is common to neighbouring fine-grids are obtained from previous values at primary level fine-grid cell solution points adjacent to that common interface.

According to a second aspect of the present invention there is provided an apparatus for obtaining a numerical approximation of a physical system to be simulated, the apparatus-comprising: i) a domain comprising a coarse-grid, having a plurality of coarse-grid cells, and two or more neighbouring primary level fine-grids having a plurality of primary level fine-grid cells of refinement integer k, wherein each of the coarse-grid and fine-grid cells holds one or more solution points at which values representing a physical quantity of the physical system to be simulated may be obtained; and ii) calculation means, operable to perform a calculation procedure in order to obtain a value for at least one solution point of every cell at a given stage in time wherein, during the calculation procedure, new values at primary level fine-grid cell solution points at an interface between the coarse-grid and the primary level fine-grid which is common to neighbouring fine-grids are obtained from previous values at primary level fine-grid cell solution points adjacent to that common interface.

In accordance with embodiments of the first or second aspects of the present invention, the coarse-grid interface values present on the common interfaces between neighbouring fine-grid regions are therefore not utilised during the update. Rather, new fine-grid solutions at the common interface are obtained using previous values from fine-grid solution points adjacent to the common interface. Thus, in effect, the overall perimeter of the plurality of adjoined grids defines the perimeter of a fine-grid region which, due to the way in which information is transferred between adjoining fine-grids, can be considered to comprise a single entity.

It should however be appreciated that, other than at a common interface between neighbouring fine-grids, solutions for fine-grid cells on the perimeter of each fine-grid must still be obtained from the co-located coarse-grid value by means of spatial and temporal interpolation. The term "neighbouring" should be interpreted as meaning that the fine-grids have at least one co-located solution point.

The refinement integer k is the whole number by which a cell has been divided in each of the x, y, and z directions (for a 3-dimensional grid structure). It is therefore the ratio between the coarse-grid cell dimensions and the fine-grid cell dimensions. Thus, if a coarse cell has fine-grid cells of refinement level k embedded within it, there will be k fine-grid cells in each direction. It should be appreciated that domains having several levels of refinement are envisaged in which a fine-grid having a higher level of refinement may be embedded within a fine-grid having a lower level of refinement. For example, a primary level fine-grid may have at least one secondary level fine-grid embedded within one or more of the primary level fine-grid cells, wherein the secondary level fine-grid has a refinement integer I, where I>k (where k is the refinement integer of the primary level fine-grid). In other words, the secondary level fine-grid has a refinement integer I>1 with respect to the primary level fine-grid. Thus, in situations where significant refinement of the coarse grid is needed in order to resolve a particular feature or source of inhomogeneity, the required level of refinement can be advantageously achieved in a series of refinement stages. In this way, the discontinuity between the coarse grid and the ultimate grid of required refinement level is more gradually introduced bringing a greater level of stability to the calculation procedure.

Preferred embodiments of the first and second aspects of the present invention advantageously introduce fewer errors to the solution process than previously proposed subgridding methods since values are transferred between neighbouring fine-grids of the same refinement level. Thus, techniques embodying the first or second aspects of the present invention take advantage of the spatial correspondence between the fine-grid cells of neighbouring fine-grids thereby circumventing the need to conduct spatial and temporal interpolation at a common interface between adjoining fine-grids.

Although more computationally efficient than domain-wide fine-gridding techniques, known subgridding methods can still be considered inefficient when used to simulate certain inhomogeneities such as small-scale structures or curved boundaries. The reason for this can be understood by firstly appreciating that, due to the way in which solution points must be updated by an explicit scheme such as FD-TD, the use of regular (i.e. rectangular) shaped grids (of any refinement level) is necessary in order to allow for a complete update of that grid. It is therefore necessary for the perimeter dimensions of each fine-grid to be chosen such that the region encompasses the whole of the small-sale structure or boundary to be simulated. Consider, for example, the case of system-level electromagnetic simulations, where signal line structures are common and do not often follow a simple straight path. The application of a single embedded rectangular grid of sufficient size to broadly cover the whole signal-line structure significantly increases the calculation cost of the simulation and can be seen to be inefficient when the space occupied by the signal lines is only a minor percentage of the fine-grid space. Thus, it can be appreciated from this example that there are situations where significant areas of the domain necessitate the computational resources of a fine grid to update, but yet do not contain features worthy of the higher level of refinement.

Accordingly, preferred embodiments of the present invention also seek approximate multi-dimensional systems by resolving inhomogeneities with greater efficiency than previously considered techniques. Such a method would find particular use in FD-TD subgridding schemes and also in numerous other computational simulation procedures which employ Cartesian or non-body fitted subgridding.

Thus, in accordance with a preferred embodiment of the present invention, the fine-grids are advantageously positioned within the domain so as to substantially map a source of inhomogeneity arising in the system to be simulated. The way in which values are transferred across a coarse-fine grid interface which is common to neighbouring fine-grids compliments the use of a plurality of fine-grids which are selectively positioned within a domain to follow the geometrical outline of a source of inhomogeneity, since it allows the grids to be updated without any interpolation at a common interface between them. Thus, the adjoined grids are said to be connected, in the sense that information may be transferred between them without the need for spatial or temporal interpolation. The neighbouring fine-grids thus effectively become a single entity. Since the perimeters of adjacent fine-grids need not be co-linear, a fine-grid entity or region having a non-rectangular perimeter is thereby possible and provides a useful means by which the outline of a small-scale structure or the like may be mapped.

Positioning the or each fine-grid region within the computational domain so as to substantially map a source of inhomogeneity arising in a system advantageously provides a more efficient tool for system analysis and thereby contributes to the performance of faster simulations. Furthermore, as non-rectangular fine-grid entities are envisaged to resolve a source of inhomogeneity as an alternative to the application of a large rectangular grid, the total number of fine-grid cells required is reduced, as is the computational resources required to achieve the calculation procedure.

Preferably, the computational domain is created by means of a computer program run on a computer. Input data representing the system geometry and material properties are preferably entered by a user. Furthermore, the calculation procedure is preferably carried out by means of a computer program installed and run on a computer.

The first and second aspect of the present invention may advantageously be employed for the numerical approximation of an electromagnetic field based on a FD-TD (Finite-Difference Time-Domain) method, wherein each of the coarse-grid cells and fine-grid holds an arrangement of solution points for the electromagnetic field in which the solution points for the electric field ($\vec{E}$) are staggered orthogonally with respect to the solution points of the magnetic field ($\vec{H}$), wherein a calculation procedure is performed to obtain solutions for the electric and magnetic fields using the FD-TD updating equations which define a new value of an A-field component (where A=E or H) at a given instant in time and point in space in relation to a gradient term of a B-field (where B=H or E respectively) at the A-field point in space, the gradient term being approximated by the difference between the B-field value on one side of the A-field point in space and the B-field value on an opposite side of the A-field point in space.

Artificial temporal reflections occur in multigrid-FDTD methods when an excitation source is introduced at a fine grid. It is now appreciated that artificial temporal reflections are caused by a discrepancy which arises when the fine grid intermediate values from the excitation reach the boundary with the coarse grid if the intermediate values obtained at the boundary by temporal interpolation are inconsistent with the fine grid intermediate values. To remove this discrepancy, according to an embodiment of the present invention the same numerical scheme is used for introduction of excitation sources at a fine grid as is used for temporal interpolations at the coarse-grid/fine-grid boundary.

During the calculation procedures performed in order to update the solution for a field at a given instant in time, it is necessary for the whole coarse grid to be updated even in regions where one or more fine-grid exists. This, again, is due to the explicit nature of the FD-TD scheme which depends upon values being obtainable at all points in a rectangular grid of a particular refinement level in order to fully complete the update for that grid and to thus approximate electromagnetic propagation through the whole domain. If, for example, coarse-grid solutions were discontinued in regions where a fine-grid existed, there would effectively be a "hole" in the coarse-grid. It would not then be possible to update the coarse-grid at solution points in the vicinity of the fine-grid since required coarse-grid values from the fine-grid region would be missing. Furthermore, in previously considered calculation procedures used in known FD-TD techniques, in order to obtain the coarse-grid solution for a given field component in fine-grid regions, the appropriate coarse-grid values of the orthogonal field component are employed. Thus, any discrepancy that arises between the solutions obtained for grids of different refinement level can be perpetuated.

In an ideal scenario, the numerical solutions obtained for, say, the coarse-grid, would match those obtained at co-located fine-grid solution points obtained during the update of the fine-grid. However, discrepancies between grid solutions are inevitable and arise primarily due to the errors introduced into the solutions by interpolation and boundary conditions. Thus, even though there may exist a co-located solution point (i.e. where the refinement integer of the fine-grid is an odd number), the numerical coupling between the two grids may be poor. Indeed, it is a problem that there is frequently an uneven field of values around co-located edges which are common to both a fine-grid cell (or cell of higher refinement level) and a coarse-cell (or a cell of lower refinement level). Thus, in these circumstances, and to achieve a degree of stability between grids of different refinement levels, it is often necessary to conduct numerical smoothing methods. The numerical instability is further compounded in situations where the refinement integer of the higher-level fine-grid is an even number, since no central value exists along the co-located edge and additional interpolation is required to obtain the appropriate coarse-grid value required in the update calculation.

As discussed earlier, the numerical instability introduced into computer implemented simulation methods by the use of embedded fine-grids has meant that subgridding techniques have not been commonly applied in FD-TD schemes. It is therefore desirable to improve the numerical coupling between grids of different refinement level.

According to a third aspect of the present invention there is provided a computer implemented method for simulating an electromagnetic field based on a FD-TD (Finite-Difference Time-Domain) method which utilises a domain comprising a coarse grid, having a plurality of coarse-grid cells, and at least one primary level fine-grid of refinement integer k, the primary level fine-grid having a plurality of primary level fine-grid cells, each of the coarse-grid cells and fine-grid cells having an arrangement of solution points for the electromagnetic field in which the solution points for the electric field ($\vec{E}$) are staggered with respect to the solution points of the magnetic field ($\vec{H}$), wherein a calculation procedure is performed to obtain solutions for the electric and magnetic fields using the FD-TD updating equations which define a new value of an A-field component (where A=E or H) at a given instant in time and position in space in relation to a gradient term of a B-field (where B=H or E respectively) at the A-field point in space, the gradient term being approximated by the difference between the B-field value on one side of the A-field point in space and the B-field value on an opposite side of the A-field point in space, wherein the gradient term required to update the coarse-grid for an A-field component at a solution point adjacent to a co-located edge at which primary level fine-grid solution points exist on the coarse-grid is calculated using a summation of all the fine-grid B-field values at the solution points on the co-located edge.

According to a fourth aspect of the present invention there is provided an apparatus for simulating an electromagnetic field comprising:

i) a domain comprising a coarse-grid, having a plurality of coarse-grid cells, and at least one primary level fine-grid of refinement integer k, the primary level fine-grid having a plurality of primary level fine-grid cells, each of the coarse-grid cells and fine-grid cells having an arrangement of solution points for the electromagnetic field in which the solution points for the electric field ($\vec{E}$) are staggered with respect to the solution points of the magnetic field ($\vec{H}$), and ii) calculation means operable to perform a calculation procedure in order to obtain solutions for the electric and magnetic fields, the calculation means using the FD-TD updating equations which define a new value of an A-field component (where A=E or H) at a given instant in time and position in space in relation to a gradient term of a B-field (where B=H or E respectively) at the A-field point in space, the gradient term being approximated by the difference between the B-field value on one side of the A-field point in space and the B-field value on an opposite side of the A-field point in space, wherein the gradient term required to update the coarse-grid for an A-field component at a solution point adjacent to a co-located edge at which primary level fine-girid solution points exist on the coarse-grid is calculated using a summation of all the fine-grid B-field values at the solution points on the co-located edge.

Preferably, in accordance with the third and fourth aspects of the present invention, a required B-field gradient in a component direction g between spatial position (g+1) and (g) is approximated by:

$$B_{g+1} - B_g = \frac{\sum_{i=1}^{f}(B_{g+1} \cdot S_{g+1} \cdot \hat{n})_i}{V} - \frac{\sum_{i=1}^{f}(B_g \cdot S_g \cdot \hat{n})_i}{V}$$

where f denotes the number of B-field solution points to be used in the determination of the gradient term which are defined at a coordinate position (g+1) or (g) respectively, S denotes the surface area over which each solution point is defined in a direction orthogonal to the component direction g, n̂ denotes the unit normal vector and V denotes the coarse-cell volume.

Methods and apparatus embodying the third and fourth aspects of the present invention respectively advantageously provide a more accurate coarse-grid solution to be obtained in regions where a fine-grid exists since, when quantities are mapped from a grid of a higher refinement level to a grid of a lower refinement level, the approximation of the required gradient term makes use of all values arising at a co-located edge rather than simply the spatial difference between a pair of coarse-grid values. The use of the fine-grid information during the update of the coarse-grid in this way advantageously serves to improve the numerical "match" between the solutions obtained for grids of different refinement level. Thus, the need for numerical smoothing around co-located edges is reduced or not required at all. Furthermore, no interpolation is required in cases where the embedded fine-grid has an even refinement integer k (k even) so that the errors arising in the solution procedure, and which are conveyed to the graphical simulation, are reduced. The numerical stability and accuracy of the simulation is therefore advantageously improved.

According to the fifth aspect of the present invention there is provided a computer program which, when run on a computer, causes the computer to obtain a numerical approximation of a physical system to be simulated, the program comprising:

i) a domain creating program portion which creates a domain comprising a coarse-grid, having a plurality of coarse-grid cells, and a primary level fine-grid region comprising at least two neighbouring primary level fine-grids having a plurality of primary level fine-grid cells of refinement integer k, wherein each of the coarse-grid and fine-grid cells holds one or more solution points at which values representing a physical quantity of the physical system to be simulated may be obtained; and ii) a calculation program portion which performs a calculation procedure in order to obtain a value for at least one solution point of every cell at a given stage in time wherein, during the calculation procedure, new values at primary level fine-grid cell solution points at an interface between the coarse-grid and the primary level fine-grid which is common to neighbouring fine-grids is obtained from previous values at primary level fine-grid cell solution points adjacent to that common interface.

According to a sixth aspect of the present invention there is provided a computer program which, when run on a computer, causes the computer to simulate an electromagnetic field, the program comprising:

i) a domain creating program portion which creates a domain comprising a coarse-grid, having a plurality of coarse-grid cells, and a primary level fine-grid having a plurality of primary level fine-grid cells of refinement integer k, wherein each of the coarse-grid and fine-grid cells has an arrangement of solution points for the electromagnetic field in which the solution points for the electric field ($\vec{E}$) are staggered with respect to the solution points of the magnetic field ($\vec{H}$); and ii) a calculation program-portion which performs a calculation procedure in order to obtain solutions for the electric and magnetic fields, the calculation means using the FD-TD updating equations which define a new value of an A-field component (where A=E or H) at a given instant in time and point in space in relation to a gradient term of a B-field (where B=H or E respectively) at the A-field point in space, the gradient term being approximated by the difference between the B-field value on one side of the A-field point in space and the B-field value on an opposite side of the A-field point in space, wherein the gradient term required to update the coarse-grid for an A-field component at a solution point adjacent to a co-located edge at which primary level fine-grid solution points exist on the coarse-grid, is calculated using a summation of all the fine-grid B-field values at the solution points on the co-located edge.

Preferably the required B-field gradient in a component direction g between spatial position (g+1) and (g) is approximated by:

$$B_{g+1} - B_g = \frac{\sum_{i=1}^{f}(B_{g+1} \cdot S_{g+1} \cdot \hat{n})_i}{V} - \frac{\sum_{i=1}^{f}(B_g \cdot S_g \cdot \hat{n})_i}{V}$$

where f denotes the number of B-field solution points to be used in the determination of the gradient term which are defined at a coordinate position (g+1) or (g) respectively, S denotes the surface area over which each solution point is defined in a direction orthogonal to the component direction g, n̂ denotes the unit normal vector and V denotes the coarse-cell volume.

Embodiments of the present invention find particular use in numerical approximation methods which employ a domain comprising a structured Cartesian grid.

For a better understanding of the present invention, and to show how the same may be carried into effect, reference will now be made, by way of example, to the accompanying drawings in which:

FIG. 3A shows a 2-dimensional Cartesian-grid domain and FIG. 3B shows, to a larger scale, part of the domain of FIG. 3A;

Figure 1A:
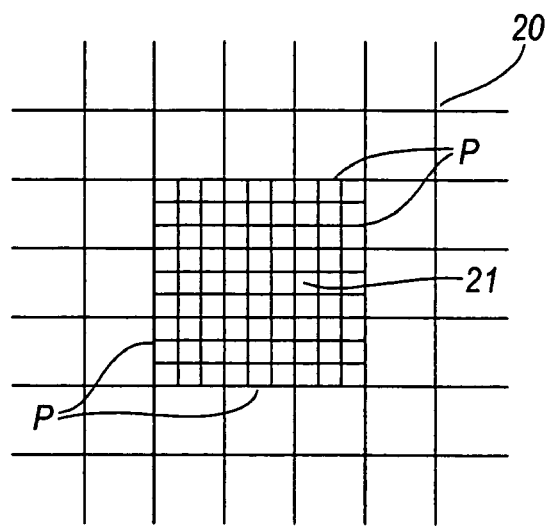
FIGS. 1A and 1B show the application of an embedded fine-grid to a computational domain illustrated in two and three dimensions respectively.
Figure 1B:
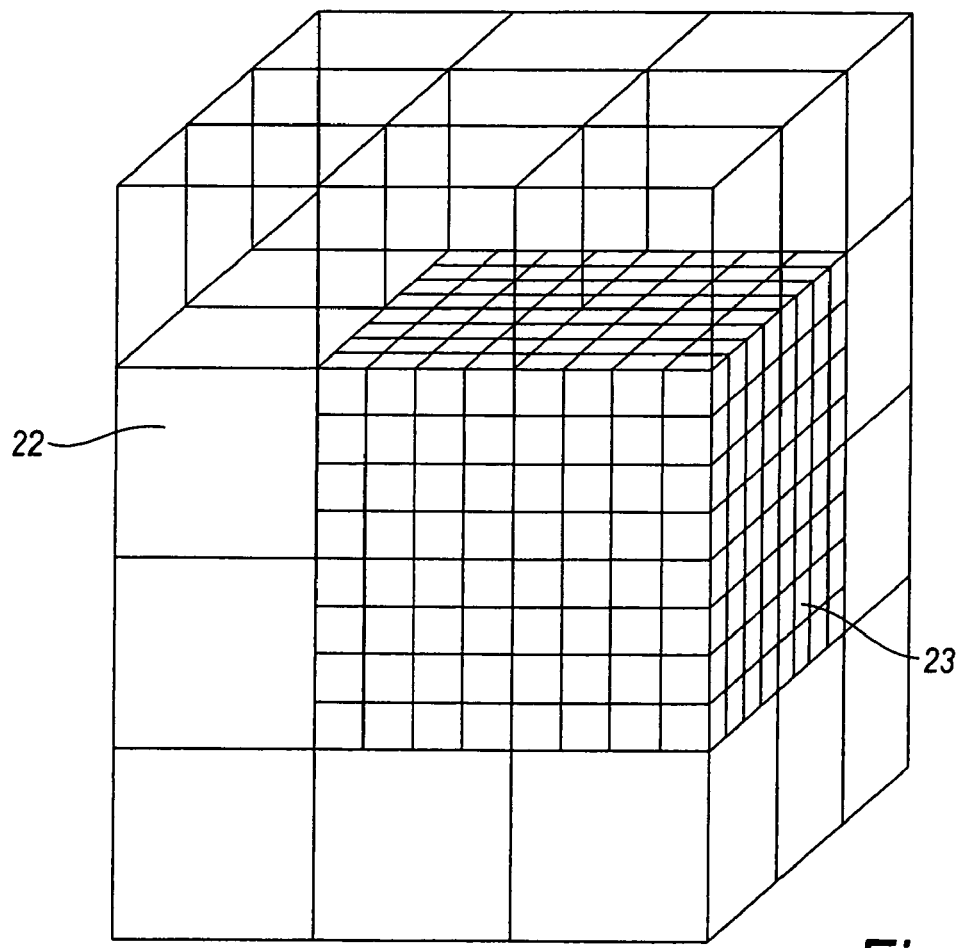

FIG. 1A shows, in 2-D, part of a computational domain comprising a coarse-grid 20 and having a fine-grid 21 embedded therein. The perimeter of the fine-grid, which is embedded within an area of nine coarse-grid cells, forms the interface between the coarse-grid and the fine-grid. FIG. 1B shows, in 3-D, part of a computational domain comprising a coarse-grid 22 and a fine-grid 23 embedded therein.

Figure 2:
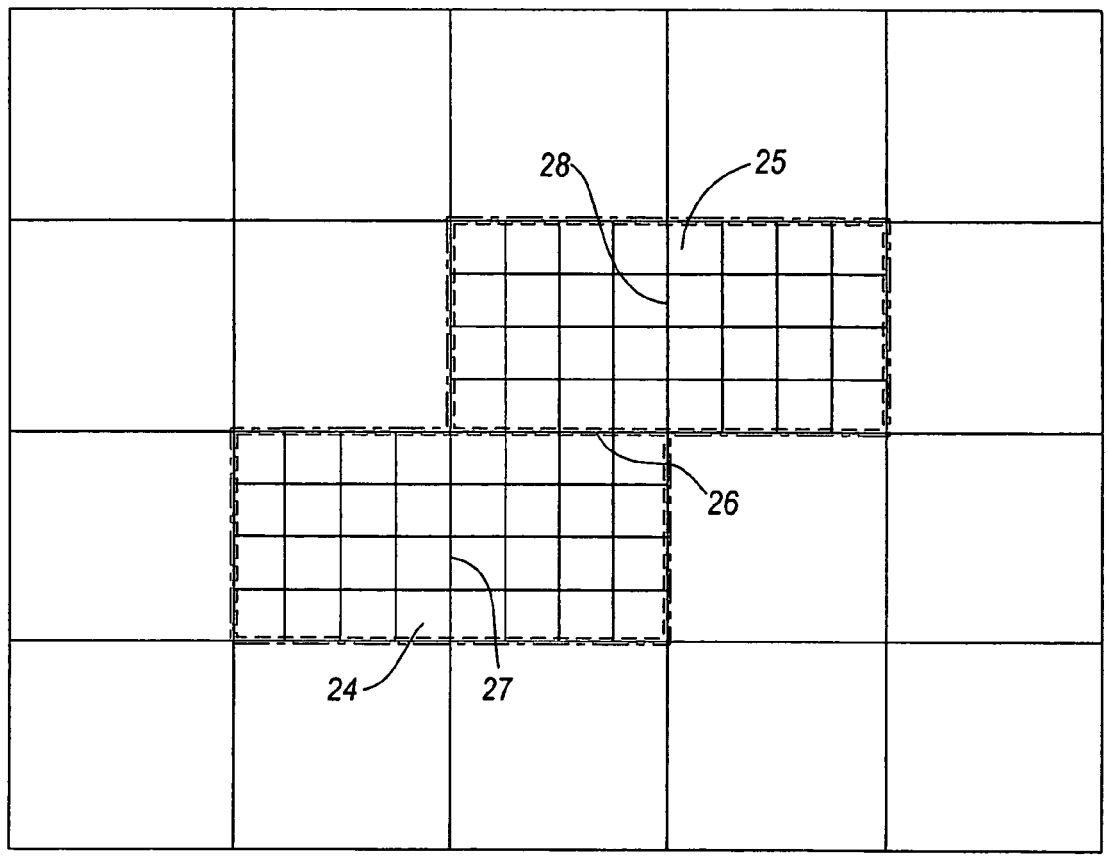
FIG. 2 shows an embedded fine-grid region comprising two adjoining fine-grids.

Part of a computational domain is also shown in FIG. 2. The domain comprises two adjoining fine-grids 24 and 25. The perimeter of each grid, denoted by line M, forms an interface between the coarse-grid and each of the fine-grids. A common interface 26 therefore exists between the two grids. In accordance with embodiments of the first and second aspects of the present invention, information is transferred across this common interface. At all other interfaces, which form a perimeter denoted by the line N around the fine-grid region formed by the two fine-grids 24 and 25, it is necessary to conduct spatial and temporal interpolation in order to map values from the coarse-grid to the fine-grid. It can be seen that there will exist a number of co-located edges at which primary level fine-grid solution points exist on the coarse-grid. In addition to all the interface edges between the coarse and fine-grid which are also co-located edges, 27 and 28 comprise co-located edges within each of the fine-grids 24 and 25. In accordance with embodiments of the third and fourth aspects of the present invention, during the update of the coarse-grid in the fine-grid region, the field values at these co-located edges are summed and used in an approximation of the gradient term required for an electromagnetic simulation using the FD-TD updating stencils.

FIG. 3A shows a two-dimensional domain comprising a coarse-grid 1 having a fine-grid region 2 of refinement integer k=4, the fine-grid region being comprised of six neighbouring fine-grids $S_1$ to $S_6$, each fine-grid being embedded within a single coarse-grid cell. P defines the perimeter of the fine-grid region and is comprised of the external interfaces e between the coarse-grid and fine-grid region. A common interface i exists at each point within the fine-grid region 2 where the edge or face of the cells of the primary level region coincide with the edge of face of the cells of the coarse-grid region. Each grid point may be represented by a pair of integers (i, j), where i and j are grid coordinate numbers in the x-axis and y-axis directions respectively. Each of the cells comprises a number of solution points for the numerical approximation which are solved at a given instant in time. Thus, the picture simulated from the mathematical solutions on the grid is representative of the physical system being simulated at a given instant in time n. In this illustration, solution points are provided at each of the cell edges and cell faces as depicted for fine-grid $S_4$.

In order to update the values at each of the solution points a so-called explicit time-marching solution procedure is carried out in which solutions are obtained at a given instant in time with reference to values at the previous instant in time. Solutions are firstly obtained in this way for the coarse-grid. Conventionally, during the calculation procedure, and in order to update the solution points of the each of fine-grids, the fine grid values at each common interface within the fine-grid region 2 would have been obtained from the coarse-grid solution at that common interface by means of spatial and temporal interpolation. Thus, in order to obtain values $a_5$, $a_6$, $a_9$ and $a_{10}$, interpolation is conducted using $A_3$ and $A_5$. Standard linear interpolation functions are commonly used for both the temporal and spatial interpolation. In particular, the temporal interpolation function may be given by: $T(A^n, A^{n+1}, j)=A^n+j(A^{n+1}-A^n)$ where j is the missing fine-grid temporal values. For example, in FIG. 1, missing temporal value n+¼ at location $A_3$ is given by: $a^{n+1/4}=T(A_3^n, A_3^{n+1}, ¼)$. Furthermore, the spatial interpolation function may be given by: $S(A_i, A_j, d)=A_i+d(A_j-A_i)$ where i and j are the coordinates for the coarse-grid location of value A and d is the normalised distance away from i along the i to j path. For example, in FIG. 1A, the missing spatial value for $a_5$ is $a_5=S(A_3, A_5, d_5)$.

The solution points of the fine-grid cells are thus updated from the coarse-grid interface appropriate for the direction of update following interpolation methods which "fill in" the missing fine-grid values. Numerical errors are therefore introduced at every common interface within the fine-grid region. The previously considered fine-grids may therefore be said to be spatially disconnected. As a result the temporal space between adjacent fine-grids is effectively disengaged.

In contrast, in accordance with embodiments of the first or second aspects of the present invention, the coarse-grid interface values present on the common interfaces between neighbouring fine-grids are not utilised during the update. Rather, new fine-grid solutions at the common interface are obtained using previous values from fine-grid solution points adjacent to the common interface. In effect, the overall perimeter of the plurality of adjoined grids defines the perimeter of a fine-grid region which, due to the way in information is transferred between adjoining fine-grids, can be considered to comprise a single entity. Thus, in this 2-dimensional domain, values are transferred across the common interface i between the neighbouring grids, i.e. between $S_1$ and $S_2$, $S_2$ and $S_3$, $S_4$ and $S_5$ and $S_5$ and $S_6$ when updating the solution points in the x-direction and between $S_4$ and $S_1$, $S_5$ and $S_2$ and $S_6$ and $S_3$ when updating the solution points in the y-direction.

Figure 3B:
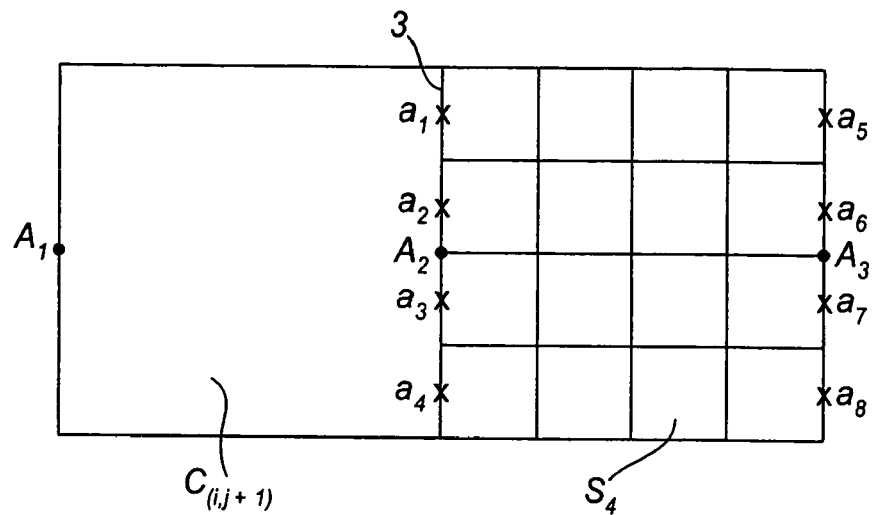

It should however be appreciated that, other than at a common interface between neighbouring fine-grids, solutions for fine-grid cells on the perimeter of each fine-grid must still be obtained from the co-located coarse-grid value by means of spatial and temporal interpolation. FIG. 3B shows an enlarged version of coarse-cell $C_{(i,j+1)}$ and fine-grid $S_4$ shown in FIG. 3A in order to illustrate the interpolation procedure required to obtain values at the initial boundary of the fine-grid region. Solutions are obtained for the coarse grid solution points $A_1$ and $A_2$ using the appropriate numerical updating stencils for the simulation. In order to commence the update for the fine-grid solution points, spatial values are required at solution points $a_1$ to $a_4$ which must be obtained from spatial and temporal interpolation between the co-located coarse-grid point $A_2$ and at least one other coarse-grid value. Standard linear interpolation functions such as those discussed above are sufficient for use in obtaining the fine-grid solutions at solution points $a_1$ to $a_4$. Thus, missing temporal value n+¼ at location $A_2$ is given by: $a^{n+1/4}=T(A_2^n, A_2^{n+1}, ¼)$. Furthermore, the spatial interpolation function may be given by: $S(A_i, A_j, d)=A_i+d(A_j-A_i)$ where i and j are the coordinates for the coarse-grid location of value A and d is the normalised distance away from i along the i to j path.

Figure 4:
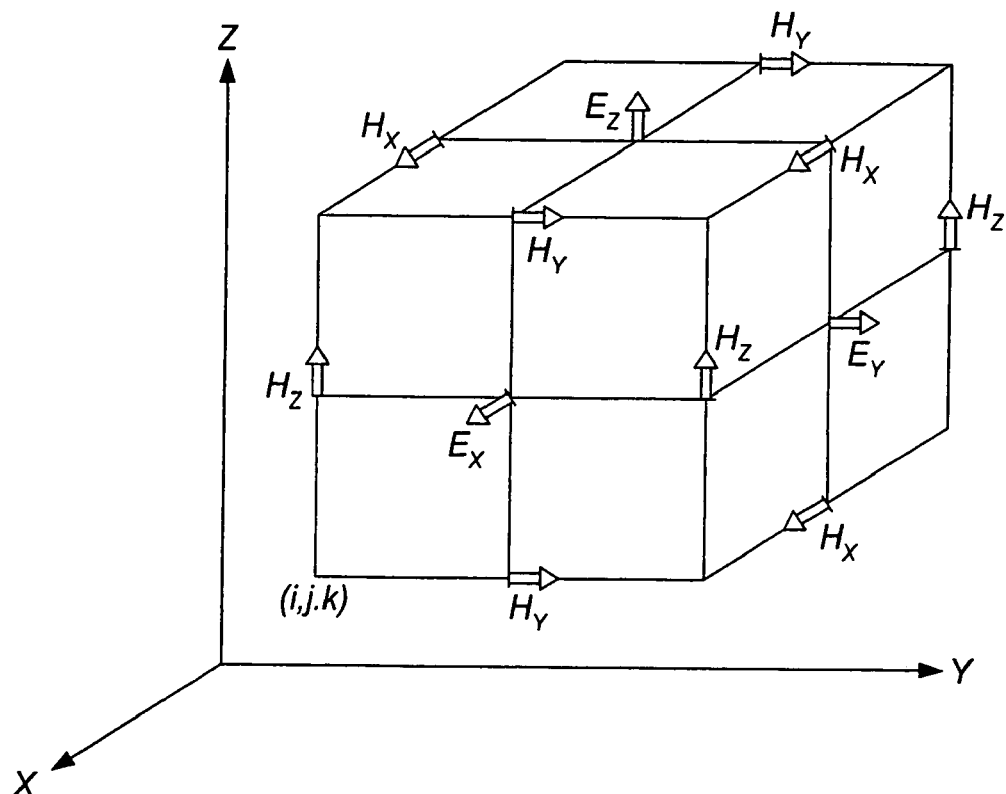
FIG. 4 shows a three-dimensional cell employed in a FD-TD (Finite-Difference Time-Domain) scheme.
Figure 5:
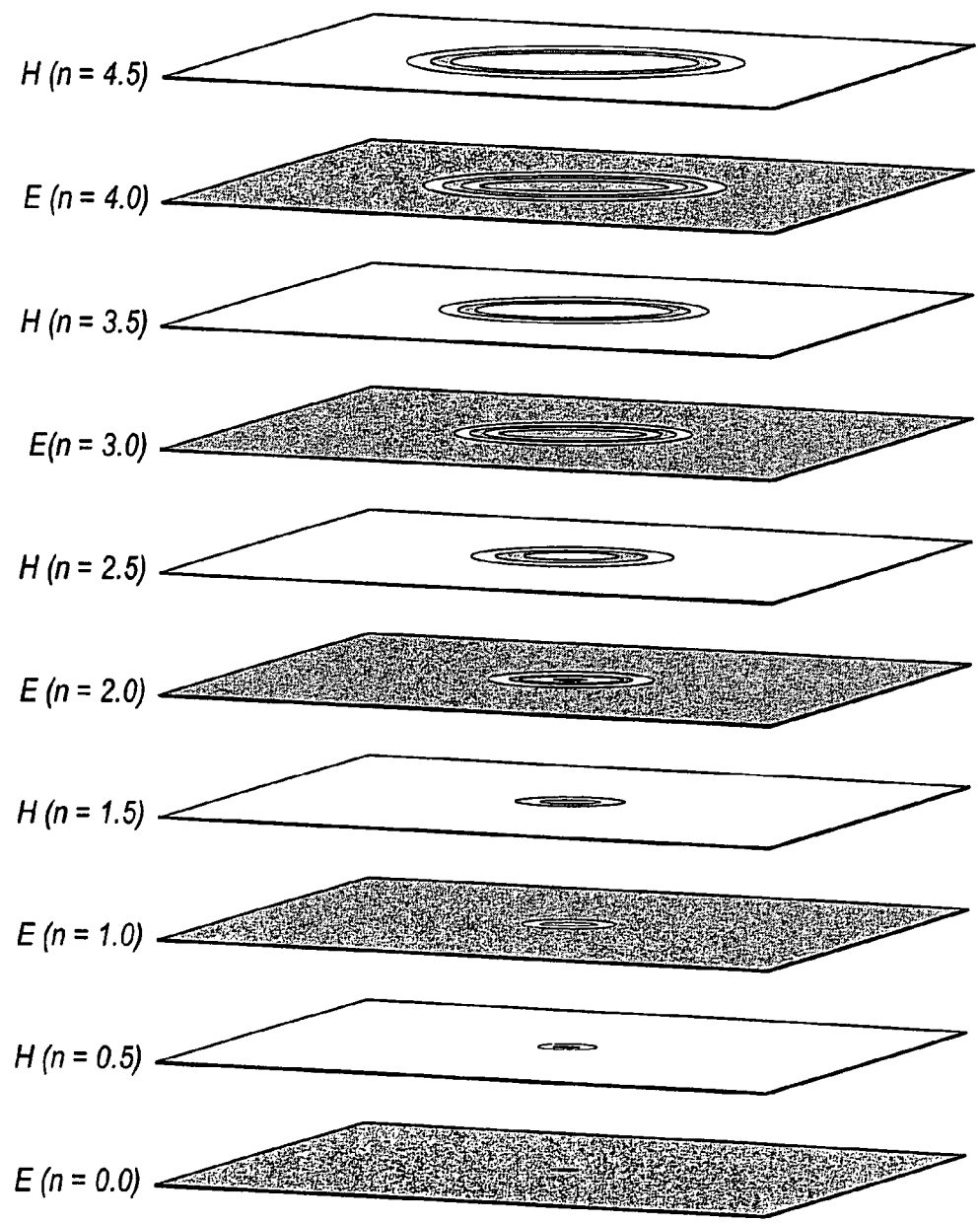
FIG. 5 illustrates a simulated electromagnetic wave propagating from a central source point.

A specific example in which an embodiment of the present invention is applied to a FD-TD scheme which utilises a structured grid such as that illustrated in FIG. 4 will now be given. FIG. 4 shows a three-dimensional cell wherein each point of the cell is represented by integers (i, j, k), where i, j and k are grid coordinate numbers in the x-axis, y-axis and z-axis directions respectively. Each of the cells comprises a number of solution points or nodes for the electric and magnetic fields at a given instant in time. In this illustration, the electric field components are defined on the cell faces and the magnetic field components are defined on the cell edges. In accordance with the FD-TD principle, the electric field solution points are therefore staggered both spatially and temporally from the magnetic field solution points. This means that no solution is obtained for both the electric and magnetic field at the same instant in time or the same position in space. Rather, the electric field is solved at a given instant in time, say n=0, 1, 2 . . . and the magnetic field is solved at the next instant in time, say n=0.5, 1.5, 2.5 . . . . This is illustrated pictorially in FIG. 5 which shows a simple electromagnetic wave propagating from a central source point where the initial field conditions are zero at all points in space.

The following background theory relating to the FD-TD scheme for simulating electromagnetic radiation is considered useful to aid the understanding of the present invention.

Any electromagnetic field is fully described by the Maxwell equations:

$$\nabla \cdot \vec{E} = 0 \quad (1)$$

$$\nabla \cdot \vec{H} = 0 \quad (2)$$

$$\mu \frac{\partial \vec{H}}{\partial t} = \nabla \times \vec{E} \quad (3)$$

$$\varepsilon \frac{\partial \vec{E}}{\partial t} + \sigma \vec{E} = \nabla \times \vec{H} \quad (4)$$

Where E=(Ex, Ey, Ez) is the electric field (V/m), H=(Hx, Hy, Hz) is the magnetic field (A/m), $\epsilon$ is the magnetic permittivity (F/m), $\mu$ is the magnetic permeability (H/m) and $\sigma$ is the electric conductivity (S/m).

Writing equations (3) and (4) in component form gives:

$$\mu \frac{\partial H_x}{\partial t} = \frac{\partial E_y}{\partial z} - \frac{\partial E_z}{\partial y} \quad (5)$$

$$\mu \frac{\partial H_y}{\partial t} = \frac{\partial E_z}{\partial x} - \frac{\partial E_x}{\partial z} \quad (6)$$

$$\mu \frac{\partial H_z}{\partial t} = \frac{\partial E_x}{\partial y} - \frac{\partial E_y}{\partial x} \quad (7)$$

$$\varepsilon \frac{\partial E_x}{\partial t} + \sigma E_x = \frac{\partial H_z}{\partial y} - \frac{\partial H_y}{\partial z} \quad (8)$$

$$\varepsilon \frac{\partial E_y}{\partial t} + \sigma E_y = \frac{\partial H_x}{\partial z} - \frac{\partial H_z}{\partial x} \quad (9)$$

$$\varepsilon \frac{\partial E_z}{\partial t} + \sigma E_z = \frac{\partial H_y}{\partial x} - \frac{\partial H_x}{\partial y} \quad (10)$$

It can be seen from equation (3) that the time derivative of the H field is dependent on the Curl of the E field (i.e. the change in the E field across space). Similarly from equation (4), the time derivative of the E field is dependent on the change in the H field across space. This leads us to the basic FD-TD expression that the new value of the E-field $E^{N+1}$ at a given point in space is dependent on i) the old value of the E-field $E^N$ at the same point in space and ii) the difference between the old value of the H-field, $H^{N+1/2}$, on one side of the E-field point in space and the value of $H^{N+1/2}$ on another side of the E-field point in space. Similarly, the new value of the H-field is dependent on the old value of the H-field and the difference between the old values for the E-field on either side of the H-field point. Thus, approximating the spatial derivatives of equations (5) to (10) gives the following FD-TD central-difference updating stencils for the electromagnetic field:

$$H_x^{n+1/2}(i, j+1/2, k+1/2) = \quad (11)$$
$$H_x^{n-1/2}(i, j+1/2, k+1/2) + D_b(i, j+1/2,$$
$$k+1/2)[\{E_y^n(i, j+1/2, k+1) - E_y^n(i, j+1/2, k)\}/\Delta z(k) -$$
$$\{E_z^n(i, j+1, k+1/2) - E_z^n(i, j, k+1/2)\}/\Delta y(j)]$$

$$H_y^{n+1/2}(i, +1/2, j, k+1/2) = \quad (12)$$
$$H_y^{n-1/2}(i+1/2, j, k+1/2) + D_b(i+1/2, j,$$
$$k+1/2)[\{E_z^n(i+1, j, k+1/2) - E_z^n(i, j, k+1/2)\}/\Delta x(i) -$$
$$\{E_x^n(i+1/2, j, k+1) - E_x^n(i+1/2, j, k)\}/\Delta z(k)]$$

$$H_z^{n+1/2}(i+1/2, j+1/2, k) = \quad (13)$$
$$H_z^{n-1/2}(i+1/2, j+1/2, k) + D_b(i+1/2, j+1/2,$$
$$k)[\{E_x^n(i+1/2, j+1, k) - E_x^n(i+1/2, j, k)\}/\Delta y(j) -$$
$$\{E_y^n(i+1, j+1/2, k) - E_y^n(i, j+1/2, k)\}/\Delta x(i)]$$

$$E_x^{n+1}(i+1/2, j, k) = \quad (14)$$
$$C_a(i+1/2, j, k) \cdot E_x^n(i+1/2, j, k) + C_b(i+1/2, j,$$
$$k)[\{H_z^{n+1/2}(i+1/2, j+1/2, k) - H_z^{n+1/2}(i+1/2, j-1/2, k)\}/$$
$$\Delta y(j) - \{H_y^{n+1/2}(i+1/2, j, k+1/2) -$$
$$H_y^{n+1/2}(i+1/2, j, k-1/2)\}/\Delta z(k)]$$

$$E_y^{n+1}(i, j+1/2, k) = \quad (15)$$
$$C_a(i, j+1/2, k) \cdot E_y^n(i, j+1/2, k) + C_b(i, j+1/2,$$
$$k)[\{H_x^{n+1/2}(i, j+1/2, k+1/2) - H_x^{n+1/2}(i, j+1/2, k-1/2)\}/$$
$$\Delta z(k) - \{H_z^{n+1/2}(i+1/2, j+1/2, k) -$$
$$H_z^{n+1/2}(i-1/2, j+1/2, k)\}/\Delta x(i)]$$

$$E_z^{n+1}(i, j, k+1/2) = C_a(i, j, k+1/2) \cdot E_z^n(i, j, k+1/2) + \quad (16)$$
$$C_b(i, j, k+1/2)[\{H_y^{n+1/2}(i+1/2, j, k+1/2) -$$
$$H_y^{n+1/2}(i-1/2, j, k+1/2)\}/\Delta x(i) -$$
$$\{H_x^{n+1/2}(i, j+1/2, k+1/2) - H_x^{n+1/2}(i, j-1/2, k+1/2)\}/\Delta$$
$$y(j)]$$

Where $D_b(i, j, k) = \dfrac{\Delta t}{\mu(i, j, k)}$ $$C_a(i, j, k) = \frac{2\varepsilon(i, j, k) - \sigma(i, j, k)\Delta t}{2\varepsilon(i, j, k) + \sigma(i, j, k)\Delta t}$$

$$C_b(i, j, k) = \frac{2\Delta t}{2\varepsilon(i, j, k) + \sigma(i, j, k)\Delta t}$$

During the computational simulation, equations (11) to (16) are solved in a leap-frog manner to incrementally advance the E and H fields forward in time by a time step $\Delta t$.

Figure 6A:
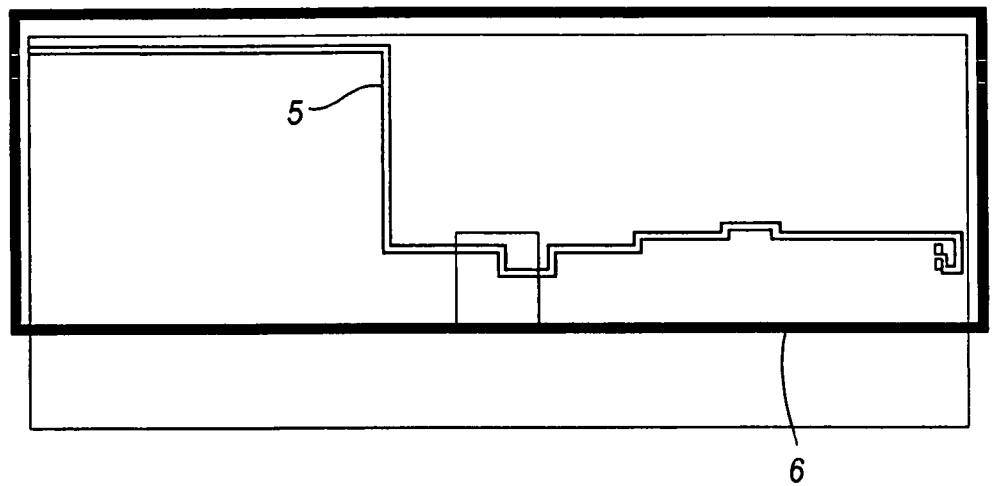
FIG. 6A shows the application of a fine-grid region to a signal line structure according to the prior art and FIG. 6B shows the application of a fine-grid region to a signal line structure according to an embodiment of the present invention.

FIG. 6 shows a signal line structure 5 for which a model of the electromagnetic radiation arising in the vicinity of the signal line is required. FIG. 6A shows a large fine-grid region 6 applied to the domain required to obtain the numerical approximation of the signal line structure. It can be seen that there are significant areas of the domain which do not contain features requiring the higher level of refinement but which will require the computational resources of a fine grid to process.

Figure 6B:
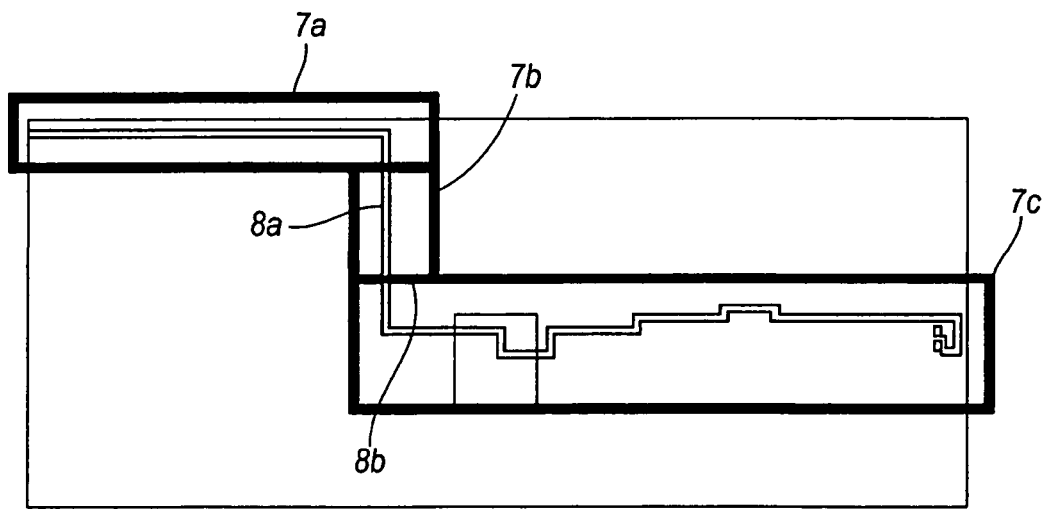

FIG. 6B illustrates the way in which a plurality of fine-grids 7a, 7b and 7c can be positioned within a computational domain so as to substantially map the geometrical outline of the signal line. Intelligently positioning a fine-grid region comprising a plurality of fine-grids within a gridded domain allows a source of inhomogeneity arising in a system to be efficiently processed and resolved.

In particular, according to a preferred embodiment, new values at primary level fine-grid cell solution points at each common interface 8a and 8b between the neighbouring fine-grid regions are obtained from previous values at primary level fine-grid cell solution points adjacent to the common interface. Thus, even though the boundaries of adjacent fine-grids may not be co-linear, during the calculation procedure, all of the neighbouring fine-grids are treated as if they were a single entity since information may be transferred between neighbouring fine-grids.

Figure 7E:
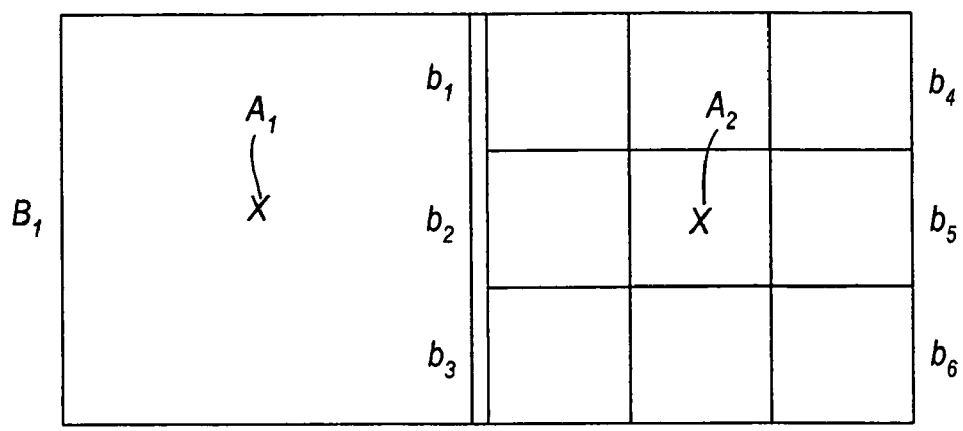
FIG. 7 illustrates solution points arising at and adjacent to a co-located edge.

FIG. 7 illustrates, in two-dimensions, the way in which the discontinuity in the number of solution points held by two grids of different refinement levels can be dealt with. In particular, FIGS. 7A and 7B illustrate a previously considered procedure for updating the coarse-grid solution points in regions where a fine-grid exists and FIGS. 7C and 7D illustrate the procedure for updating the coarse-grid solution points according to an embodiment of the present invention in order to improve the numerical coupling between grids of different refinement level.

FIGS. 7A and 7C shows two cells 11 and 12 of a grid 10 having a refinement integer k, where k=1. Embedded within cell 12 is a grid 13 of refinement integer I, where I=3. The stars 14 indicate the points on the interface which must be determined by means of spatial and temporal interpolation from value $E_{y2}$ and which form the fixed boundary conditions.

In previously considered updating procedures, in order to obtain the coarse-grid solution $H_z$ the y-component of the gradient term, $$\left(\frac{\partial E_y}{\partial x}\right),$$

is determined, in accordance with the spatial difference approximation employed by the FD-TD updating equations, by $E_{x+1} - E_x$ which can be found by $(ey_b - Ey_2)$. However, a more accurate approximation of the gradient term can be achieved in accordance with embodiments of the second and third aspects of the present invention by considering all values which exist along a co-located edge where fine-grid values are defined on the coarse-grid. Thus, in order to find the gradient term between two spatial positions on the coarse-grid level, rather than use the single coarse-grid values at each spatial position, embodiments of the present invention utilise the plurality of field values defined on the coarse-grid. In the example shown in FIG. 7C the gradient term can be found in accordance with embodiments of the present invention by a summation of the plurality of field values available along the co-located edge i where the fine-grid values coincide with the edge of the coarse-grid. Thus, $$\left(\frac{\partial E_y}{\partial x}\right) \approx Ey_{x+1} - Ey_x = \frac{\sum_{i=1}^{f}(Ey_{x+1} \cdot S_{x+1} \cdot \hat{n})_i}{V} - \frac{\sum_{i=1}^{f}(Ey_x \cdot S_x \cdot \hat{n})_i}{V}$$

where f denotes the number of electric-field solution points to be used in the determination of the gradient term which are defined in the y-direction at spatial position (x+1) or (x) respectively, S denotes the surface area over which each solution point is defined in a direction orthogonal to the component direction x (i.e. y-direction), $\hat{n}$ denotes the unit normal vector and V denotes the coarse-cell volume.

Other components of the gradient term can likewise be obtained for both the E- and the H-fields.

Considering now FIGS. 7B and 7D which show two cells 16 and 17 of a grid 15 having a refinement integer k, where k=1. Embedded within cell 17 is a grid 18 of refinement integer I, where I=2. The stars 19 indicate the points on the grid interface which must be determined by means of spatial and temporal interpolation from value $E_{y2}$ and which form the fixed boundary conditions.

In this case, in order to find the coarse-grid solution $H_z$ by previously considered techniques, the y-component of the gradient term $$\left(\frac{\partial E_y}{\partial x}\right),$$

is determined in accordance with the spatial difference approximation employed by the FD-TD updating equations. However, the E-field value required by the FD-TD central differencing scheme must be obtained by spatial interpolation from values $ey_a$ and $ey_b$. Thus, in even subdivision cases, errors are introduced in the values of the coarse-grid solution at every co-located edge within the domain.

The summation of the field quantities at co-located edges where fine-grid values are defined on the coarse-grid can be justified by considering the divergence theorem in which the volume integral of the divergence of a field is equal to the surface integral of that field. Expressing this mathematically for the electric field component in the y-direction gives:

$$\int_V \frac{\partial E_y}{\partial x} dV = \int_S \partial E_y dS \qquad (17)$$

where V, S and x denote volume, surface are and x-direction respectively. The surface integral can be approximated by a summation of the field quantities at the cell surfaces as follows:

$$\int_S E_y dS \approx \sum_{i=1}^{F}(E_y \cdot S \cdot \hat{n})_i \qquad (18)$$

where F denotes the total number of surfaces and $\hat{n}$ denotes the surface outward normal vector.

Thus, the calculation of the gradient or derivative term for $E_y$ is:

$$\frac{\partial E_y}{\partial x} = \frac{\sum_{i=1}^{F}(Ey \cdot S \cdot \hat{n})_i}{V} \qquad (19)$$

$$= \frac{\sum_{i=1}^{f}(Ey_{x+1} \cdot S_{x+1} \cdot \hat{n})_i}{V} - \frac{\sum_{i=1}^{f}(Ey_x \cdot S_x \cdot \hat{n})_i}{V}$$

Where F is the total number of surfaces used in the calculation of the gradient term (i.e. the surfaces f at $E_{x+}1$ and the surfaces f at $E_x$). Thus, in more general terms, a required B-field gradient (where B=E or H) in a component direction g between spatial position (g+1) and (g) is approximated by:

$$B_{g+1} - B_g = \frac{\sum_{i=1}^{f}(B_{g+1} \cdot S_{g+1} \cdot \hat{n})_i}{V} - \frac{\sum_{i=1}^{f}(B_g \cdot S_g \cdot \hat{n})_i}{V}$$

where f denotes the number of B-field solution points to be used in the determination of the gradient term which are defined at a coordinate position (g+1) or (g) respectively, S denotes the surface area over which each solution point is defined in a direction orthogonal to the component direction g, $\hat{n}$ denotes the unit normal vector and V denotes the coarse-cell volume.

Considering as an example the calculation of a new value of A (where A=E or H) at a given instant in time and point in space. This calculation requires an approximation of the gradient of the B-field (where B=H or E respectively) between a first point on one side of the A-field point in space and a second point on an opposite side of the A-field point in space. FIG. 7D illustrates how co-located edges at which fine-grid values are defined on the coarse grid may be used to find the B-field gradient required to update the coarse-grid value of $A_1$:

$$\frac{\partial B_y}{\partial x} = \frac{\sum_{i=1}^{F}(B_y \cdot S \cdot \hat{n})_i}{V} \qquad (20)$$

$$= \frac{(b_1 + b_2 + b_3) dy/3 - B_1 dy}{dx \cdot dy}$$

In order to update the coarse-grid value of $A_2$, the following calculation is performed:

$$\frac{\partial B_y}{\partial x} = \frac{\sum_{i=1}^{F}(B_y \cdot S \cdot \hat{n})_i}{V} \qquad (21)$$

$$= \frac{(b_4 + b_5 + b_6) dy/3 - (b_1 + b_2 + b_3) dy/3}{dx \cdot dy}$$

The above gradient terms can therefore be used to obtain $\nabla E_x$, $\nabla E_y$, $\nabla E_z$, $\nabla H_x$, $\nabla H_y$ and $\nabla H_z$.

Considering as an example the Hx component gives:

$$\nabla H_x = \frac{\sum_{i=1}^{F}(H_y \cdot S \cdot \hat{n})_i}{V} - \frac{\sum_{i=1}^{F}(H_z \cdot S \cdot \hat{n})_i}{V} \qquad (22)$$

Similar expression can likewise be obtained for $\nabla E_x$, $\nabla E_y$, $\nabla E_z$, $\nabla H_x$, $\nabla H_y$ and $\nabla H_z$.

Examples of the procedures involved in performing a simulation will now be discussed with reference to the specific example of simulating an electromagnetic field using the FD-TD scheme.

The domain in which the simulation is to be performed is normally created by means of a computer program implemented on a computer. The geometry of the system to be simulated must be specified pre-processing by a user, together with details of the initial field conditions (which may be zero), a function representing at least one source of electromagnetic radiation and the material properties (e.g. the magnetic permittivity $\epsilon$, the magnetic permeability $\mu$, and the electric conductivity $\sigma$ may be defined). Furthermore, in order to produce an accurate solution to Maxwell's equations, the results should represent a solution over an infinite space. However, practical limitations of computer power and memory require the termination of the computational grid. Any such termination method must not affect the computations inside the finite computational grid. Thus, boundary conditions to this effect are imposed on the computational domain boundaries before the simulation is performed. Due to the explicitness of the FD-TD method, Dirichlet (fixed value) interface boundary conditions are the most appropriate for the embedded fine grid boundary.

In a preferred embodiment in which fine-grid regions, possibly of varying refinement levels, are positioned within the domain so as to map the geometrical outline of, for example, small-scale structures or curved boundaries, a user may specify the position, refinement level and boundary perimeter of each fine-grid region, together with its connectivity to other fine-grid regions within the domain.

Solution procedures embodying the various aspects of the present invention will now be given by way of example where E and H denote the coarse-grid values and e and h denote fine-grid field values. In each example it can be assumed that at time n=0, the values at all solution points in the domain is zero. Furthermore, for simplicity, we assume that $\epsilon=1$, $\mu=1$ and $\sigma=1$.

Figure 9:
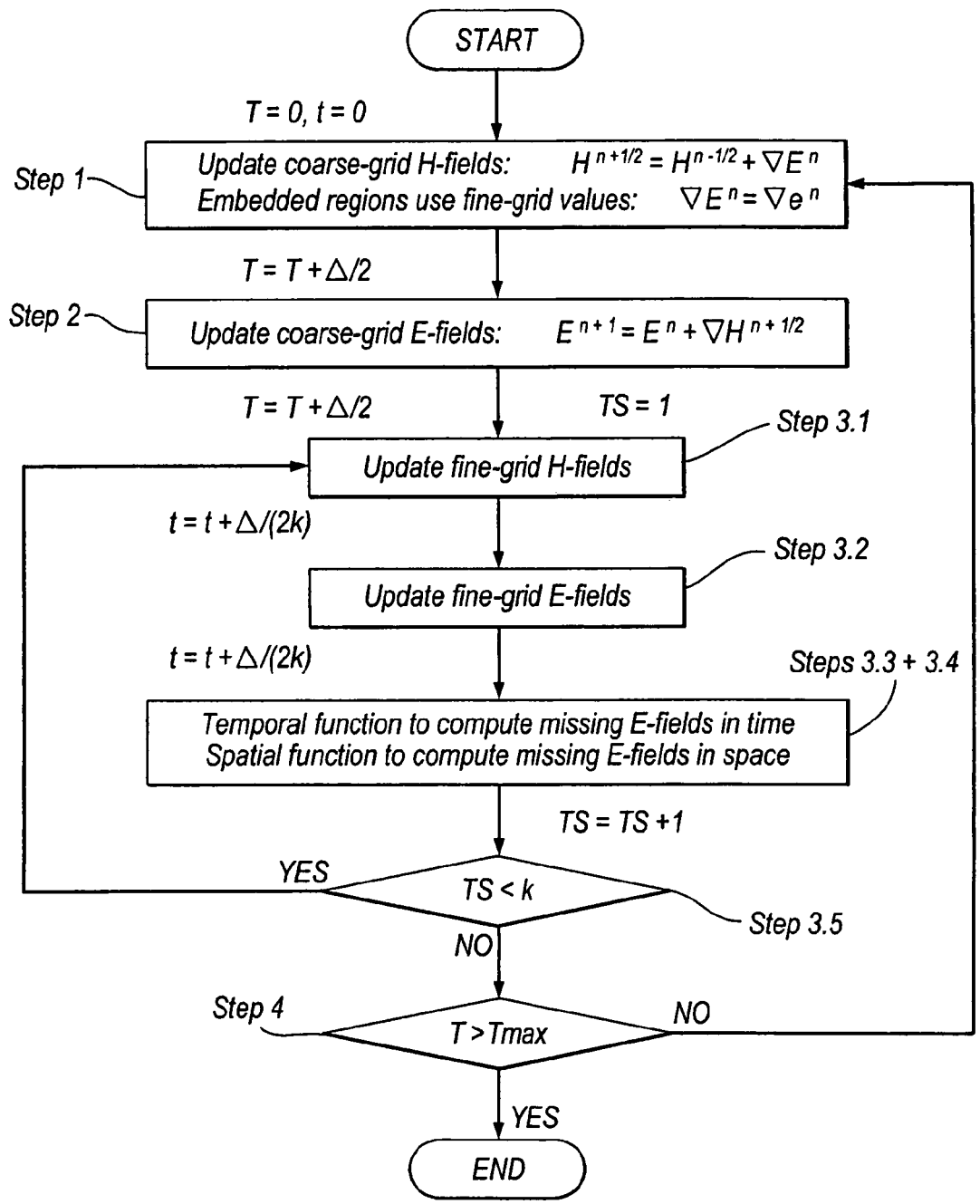
FIG. 9 is an algorithm flow chart illustrating a calculation procedure employed in an embodiment of the present invention.

With reference to the flow-chart shown in FIG. 9, the following calculation procedure, embodying the second and third aspects of the present invention, illustrates the steps involved in updating an E-field on a computational domain comprising a coarse-grid and at least one fine-grid from $E^n$ to $E^{n+1}$ over a coarse-grid time interval $\Delta T$.

Step 1: Calculate H-field of coarse-grid: $H^{n+1/2}=H^{n-1/2}+\nabla E^n$

In embedded regions take fine-grid interface values $\nabla E^n = \nabla e^n$ by using a summation of the field quantities arising at the fine-grid cell surfaces at the interface, so that an update in the x-direction, $\nabla E_x$ can be determined by:

$$\nabla E_x = \frac{\sum_{i=1}^{F}(E_y \cdot S \cdot \hat{n})_i}{V} - \frac{\sum_{i=1}^{F}(E_z \cdot S \cdot \hat{n})_i}{V}$$

Step 2. Calculate E-field of coarse grid: $E^{n+1}=E^n+\nabla H^{n+1/2}$

Step 3. Obtain the solution for the fine grid at $E^{n+1}$. Due to the CFL stability condition, solutions within the fine grid must be advanced at time step interval of $\Delta t$, where $\Delta t=\Delta T/k$. Thus, in order to update the E-field solutions at the fine-grid solution points from $E^n$ to $E^{n+1}$, intermediate solutions must be found at n+1/k, n+2/k . . . n+k/k. Thus fine-grid time stepping (TS) is conducted from TS=1 to TS=refinement integer k using the fine grid's time-step interval $\Delta t$ as follows:

Sub-Step 3.1: Calculate h-field:

$h^{n+i}=h^{n+p}+\nabla e^{n+q}$ where $i=(2(TS-1)+1)/2k$ p=(2(TS−2)+1)/2k q=(TS−1)/k Sub-step 3.2: Calculate e-field:

$e^{n+j}=e^{n+q}+\nabla h^{n+i}$ where $j=TS/k$;

Sub-step 3.3: Carry out temporal interpolation at the coarse-fine grid interface of the e-field boundary:

$e^{n+j}=T(E^n,E^{n+1},j)$ where $T(E^n, E^{n+1},j)$ is the temporal interpolation function;

Sub-step 3.4: Carry out spatial interpolation at coarse-fine grid interface to determine missing e-field boundary values:

$e^*:e^*=S(e^{n+j})$ where $S(e^{n+j})$ is the spatial interpolation function;

3.5 Advance to the next time step by incrementing TS, TS=TS+1, and returning to stage 3.1 if TS not greater than k time level;

4. Advance to next coarse grid time step by incrementing n, n=n+1, and returning to stage 1.

Thus, it can be seen that for each iteration of FD-TD on the coarse grid time step (steps 1 to 4), we must conduct k iterations of FD-TD on the fine grid time step (steps 3.1 to 3.5). This coupling procedure can be similarly performed in order to update the H field.

Figure 10A:
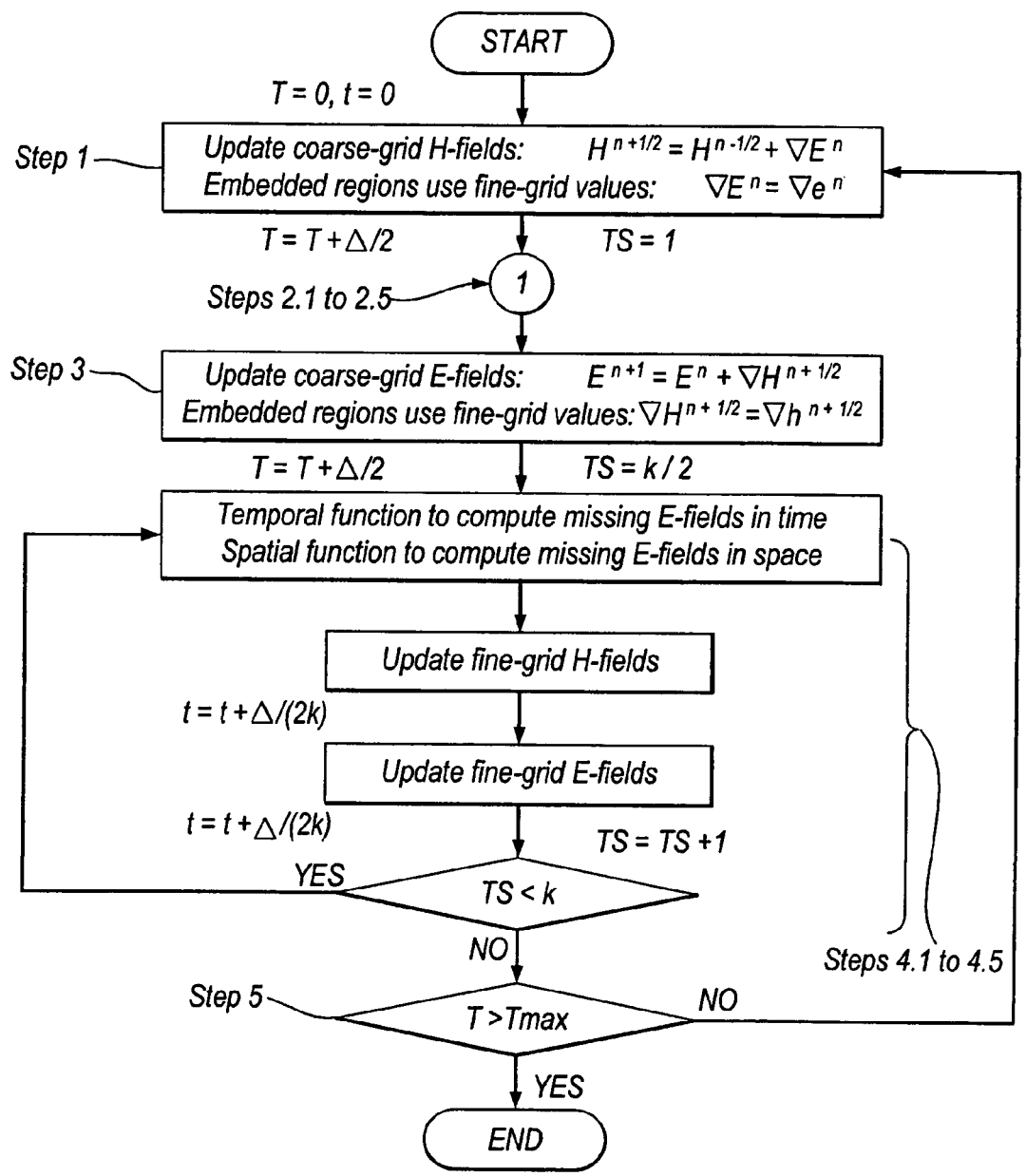
FIGS. 10A and 10B are algorithm flow charts illustrating a calculation procedure employed in further embodiment of the present invention.
Figure 10B:
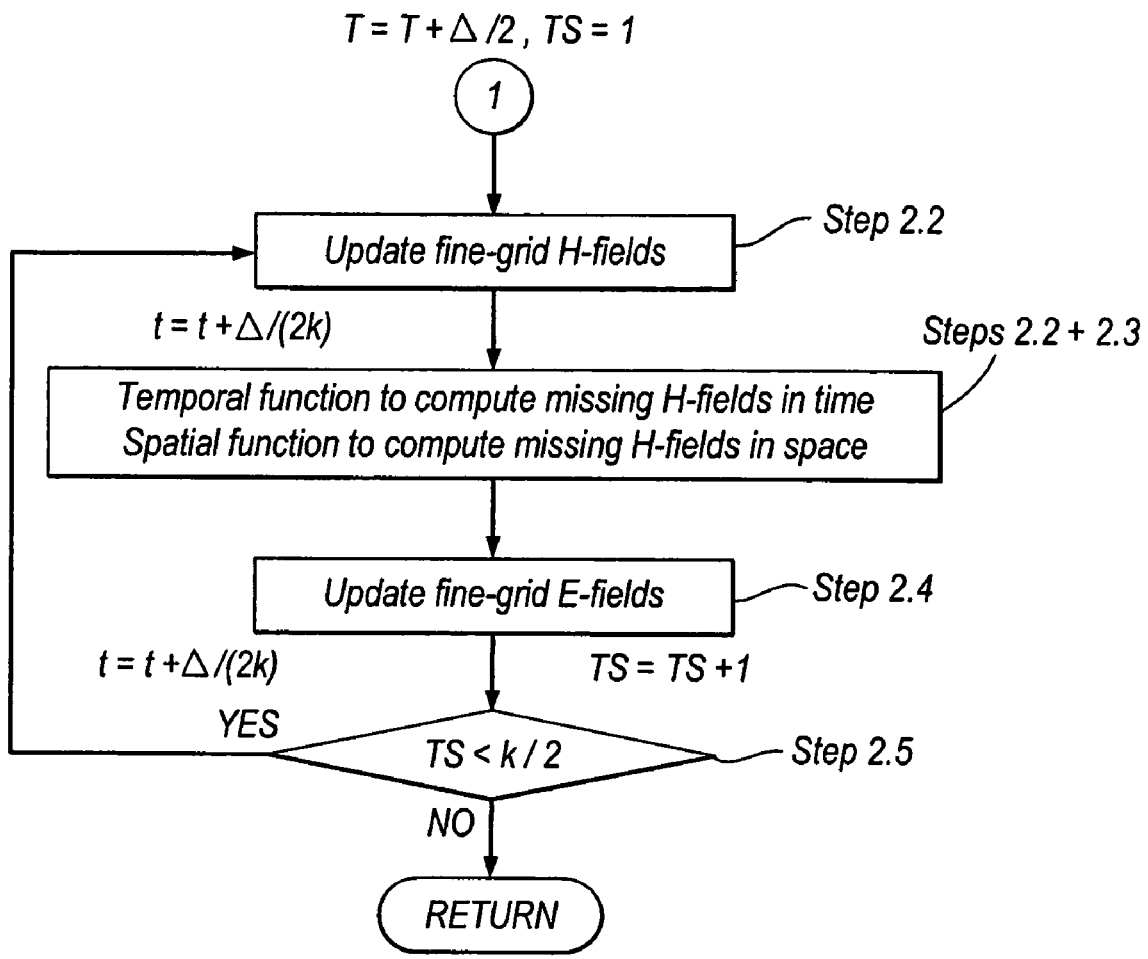

With reference to the flow charts shown in FIGS. 10A and 10B, the following calculation procedure, also embodying the second and third aspects of the present invention, illustrates the steps involved in updating both an E-field and an H-field on a computational domain comprising a coarse-grid and at least one fine-grid.

Step 1: Calculate H-field of coarse-grid: $H^{n+1/2}=H^{m-1/2}+\nabla E^n$

In embedded regions take fine grid values $\nabla E^n=\nabla e^n$ using summation of surface area so that for the x-component:

$$\nabla E_x = \frac{\sum_{i=1}^{F}(E_y \cdot S \cdot \hat{n})_i}{V} - \frac{\sum_{i=1}^{F}(E_z \cdot S \cdot \hat{n})_i}{V}$$

Step 2: Obtain $H^{n+1/2}$ solution for the fine grid. Thus fine-grid time stepping (TS) is conducted from TS=1 to TS=L (L is the refinement integer k/2 round towards nearest integer, e.g. 3/2 round to nearest integer is 2) using the fine grid's time-step interval Δt as follows:

Sub-step 2.1: Calculate h-field:

$h^{n+i}=h^{n+p}+\nabla e^{n+q}$ where $i=(2(TS-1)+1)/2k$ p=(2(TS−2)+1)/2k q=(TS−1)/k Sub-step 2.2: Carry out temporal interpolation at the coarse-fine grid interface of the h-field boundary:

$h^{n+i}=T(H^{n-1/2},H^{n+1/2},i)$ where $T(H^{n-1/2},H^{n+1/2},i)$ is the temporal interpolation function;

Sub-step 2.3: Carry out spatial interpolation at coarse-fine grid interface to determine missing h-field boundary values:

$h^*:h^*=S(h^{n+i})$ where $S(h^{n+1})$ is the spatial interpolation function;

Sub-step 2.4: Calculate e-field:

$e^{n+j}=e^{n+q}+\nabla h^{n+i}$ where $j=TS/k;$

Sub-step 2.5: Advance to the next time step by incrementing TS, TS=TS+1, and returning to sub-step 2.1 if TS not greater than L time level;

Step 3: Calculate E-field of coarse grid: $E^{n+1}=E^n+\nabla H^{n+1/2}$

In embedded regions take fine grid values $\nabla H^{n+1/2}=\nabla h^{n+1/2}$ using summation of surface area so that for the x-component:

$$\nabla H_x = \frac{\sum_{i=1}^{F}(H_y \cdot S \cdot \hat{n})_i}{V} - \frac{\sum_{i=1}^{F}(H_z \cdot S \cdot \hat{n})_i}{V}$$

Step 4: Obtain $E^{n+1}$ solution for the fine grid. Thus fine-grid time stepping (TS) is conducted from TS=L+1 to TS=refinement integer k using the fine grid's time-step interval Δt as follows:

Sub-step 4.1: Carry out temporal interpolation at the coarse-fine grid interface of the e-field boundary:

$e^{n+j}=T(E^n,E^{n+1},j)$ where $T(E^n,E^{n+1},j)$ is the temporal interpolation function;

Sub-step 4.2: Carry out spatial interpolation at coarse-fine grid interface to determine missing e-field boundary values:

$e^*:e^*=S(e^{n+j})$ where $S(e^{n+j})$ is the spatial interpolation function;

Sub-step 4.3: Calculate h-field:

$h^{n+i}=h^{n+p}+\nabla e^{n+q}$ where $i=(2(TS-1)+1)/2k$ p=(2(TS−2)+1)/2k q=(TS−1)/k Sub-step 4.4: Calculate e-field:

$e^{n+j}=e^{n+q}+\nabla h^{n+i}$ where $j=TS/k;$

Sub-step 4.5: Advance to the next time step by incrementing TS, TS=TS+1, returning to sub-step 4.1 if not greater than k time level;

Step 5. Advance to next coarse-grid time step by incrementing n, n=n+1, and returning to step 1.

Thus, in accordance with this procedure improved coupling between the coarse and the fine-grid is achieved for both fields. Note however that at stage 3 when refinement division is an even number, that there will be no $h^{n+1/2}$ values. Consider, for example, a refinement integer 2:

| $E^n$ | | $H^{n+1/2}$ | | $E^{n+1}$ |
|---|---|---|---|---|
| $e^n$ | $h^{n+1/4}$ | $e^{n+1/2}$ | $h^{n+3/4}$ | $e^{n+1}$ |

There is no-such problem when the refinement integer is an odd number:

| $E^n$ | | | $H^{n+1/2}$ | | | $E^{n+1}$ |
|---|---|---|---|---|---|---|
| $e^n$ | $h^{n+1/6}$ | $e^{n+1/3}$ | $h^{n+1/2}$ | $e^{n+2/3}$ | $h^{n+1/6}$ | $e^{n+1}$ |

There are two possible solutions to this problem. The first is to carry out temporal interpolation in order to find the $h^{n+1/2}$ values using $T(h^{n+1/4}, h^{n+3/4}, \frac{1}{2})$. This approach however will introduce new errors.

Another alternative solution is to apply different refinement divisions between spatial and temporal spaces. For example, if the refinement integer is 2, the temporal refinement integer may be 3. This odd refinement division in time therefore enables the $h^{n+1/2}$ values to be found without interpolation. Although no new errors are introduced by this approach, the computational cost can be high since an additional fine-grid time step is introduced.

Figure 8:
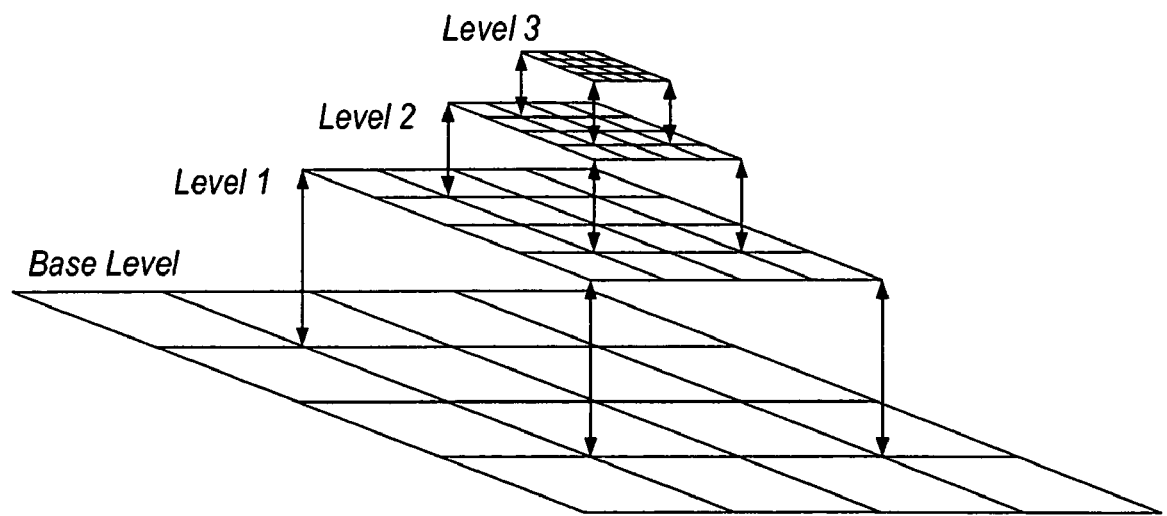
FIG. 8 shows a multi-level refinement grid.
Figure 11:
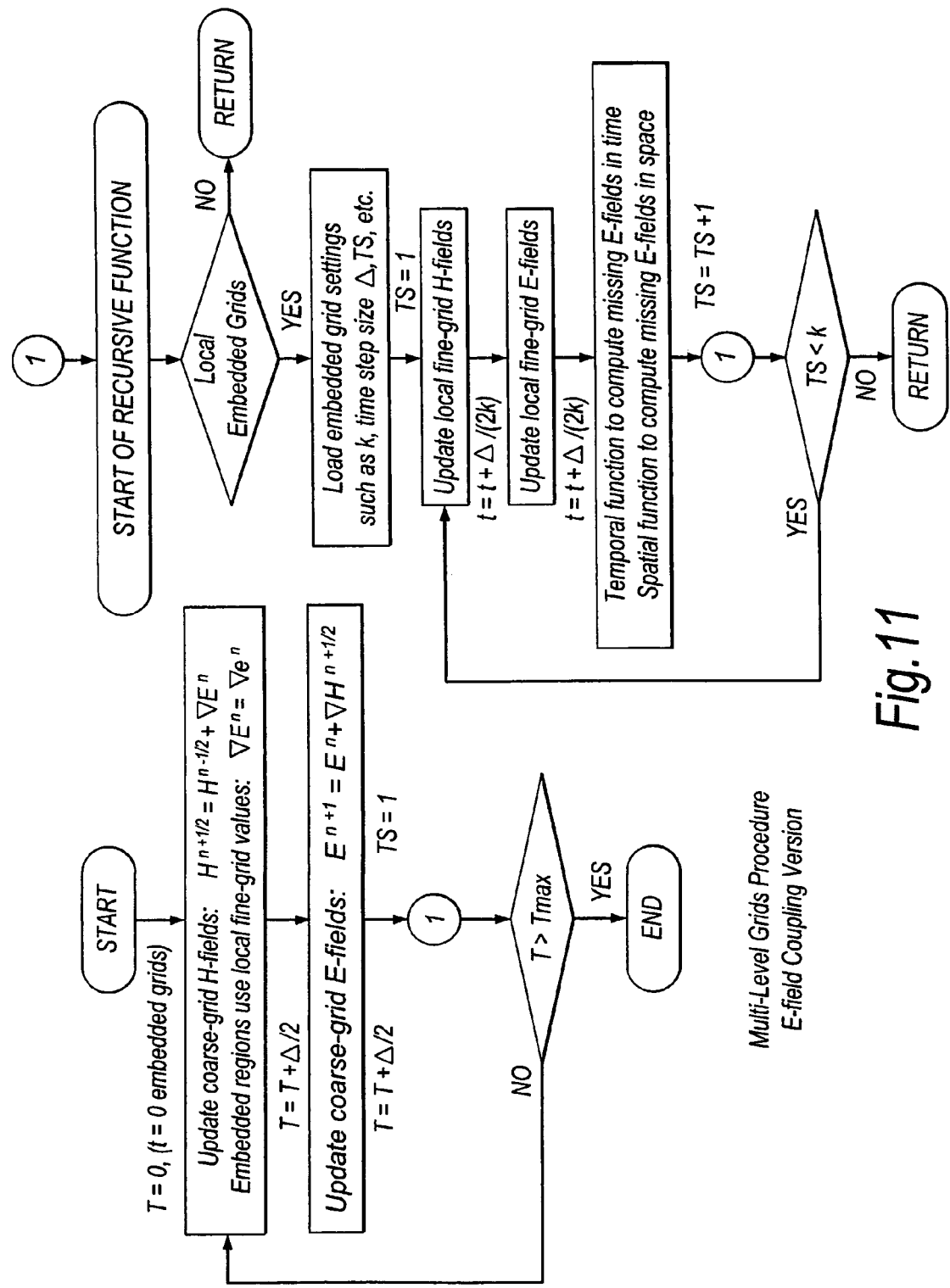
FIG. 11 is an algorithm flow chart illustrating a calculation procedure employed in a further embodiment of the present invention.

FIG. 8 shows a multi-level grid and illustrates how fine-grids of different refinement level can be introduced into a computational domain in order to resolve different levels of detail within the physical system to be simulated. A possible solution procedure for solving multi-level grids is illustrated by the flow-charts shown in FIG. 11.

As discussed above, the occurrence of artificial temporal reflections in multigrid-FDTD methods when an excitation source is introduced at a fine grid can be prevented by using the same numerical scheme for the introduction of excitation sources at a fine grid as is used for temporal interpolations at the perimeter of the primary level fine-grid region.

Examples for use in understanding this are shown in FIGS. 12A to 12D in which a step wave entering and exiting a fine grid is illustrated for simplicity.

Figure 12A:
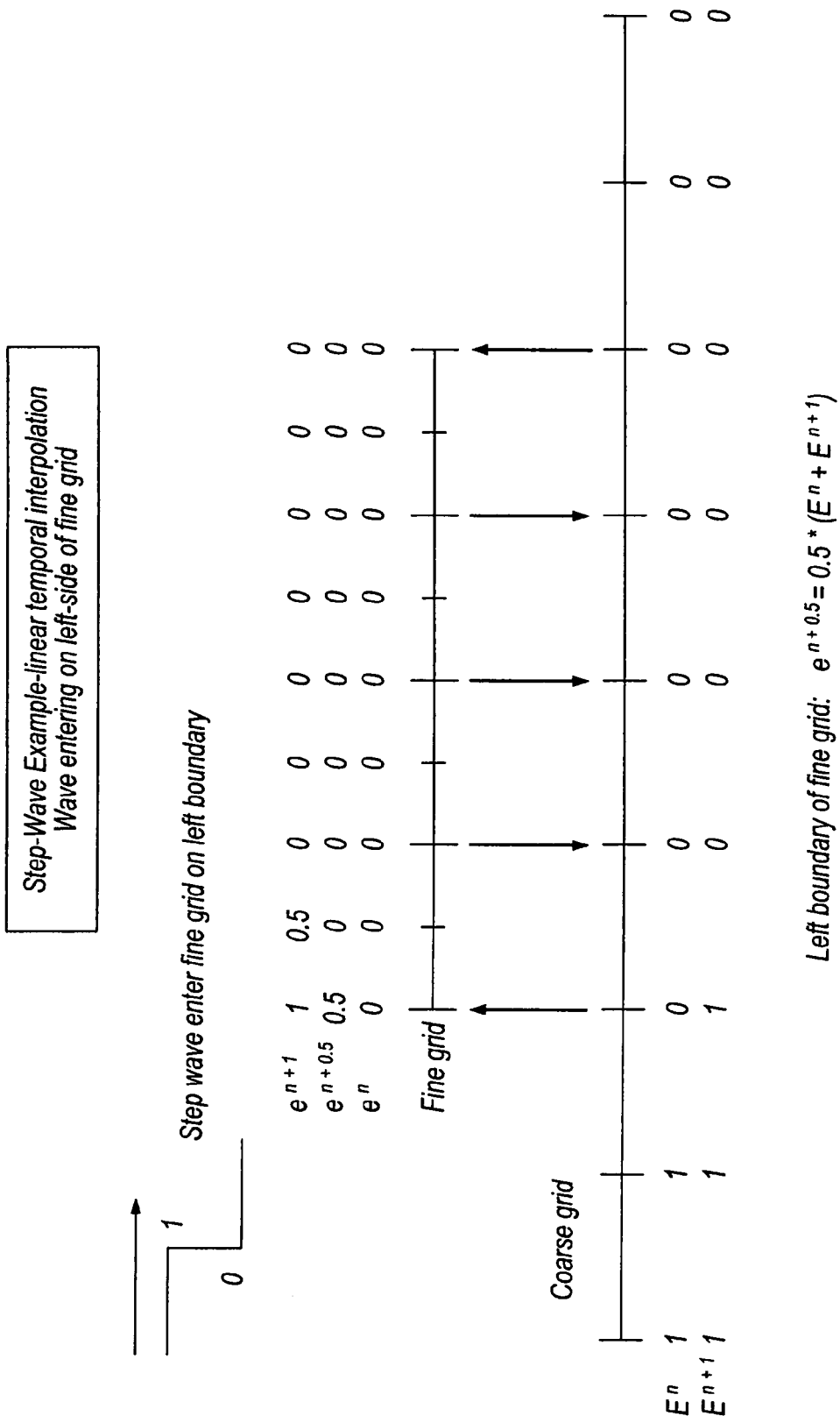
FIGS. 12A to 12D are diagrams for use in explaining artificial temporal reflection and how it can be overcome.
Figure 12B:
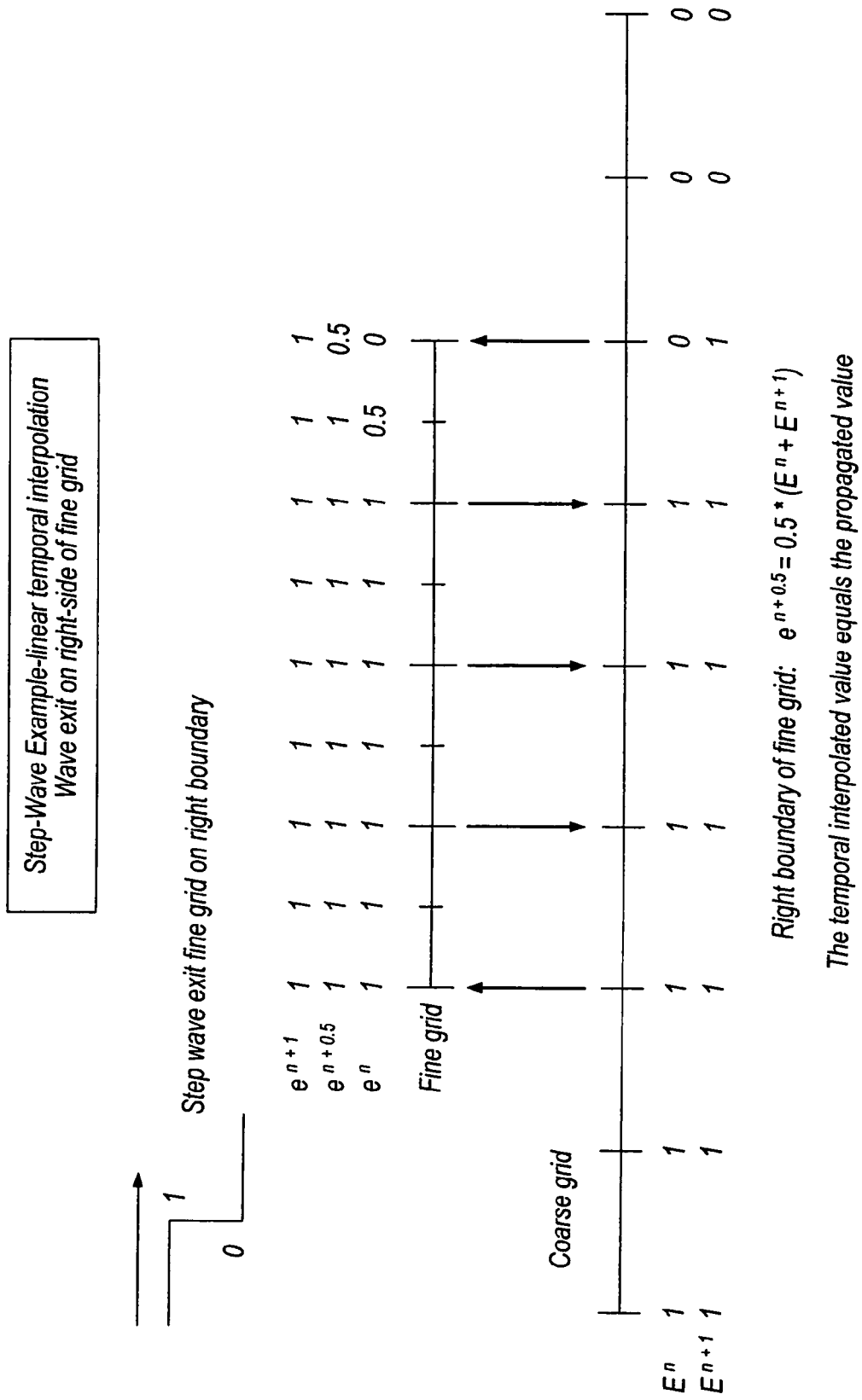
Figure 12C:
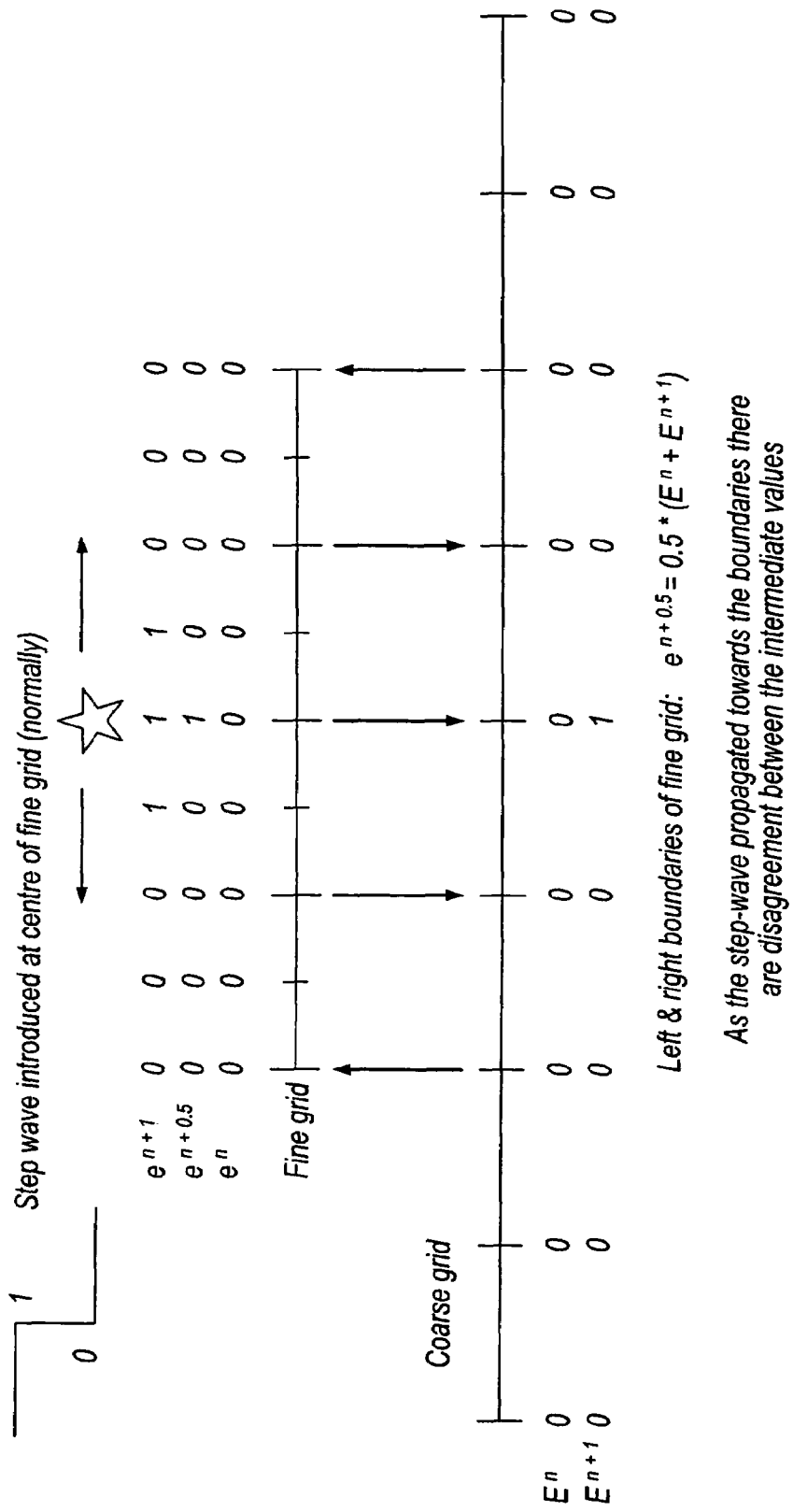
Figure 12D:
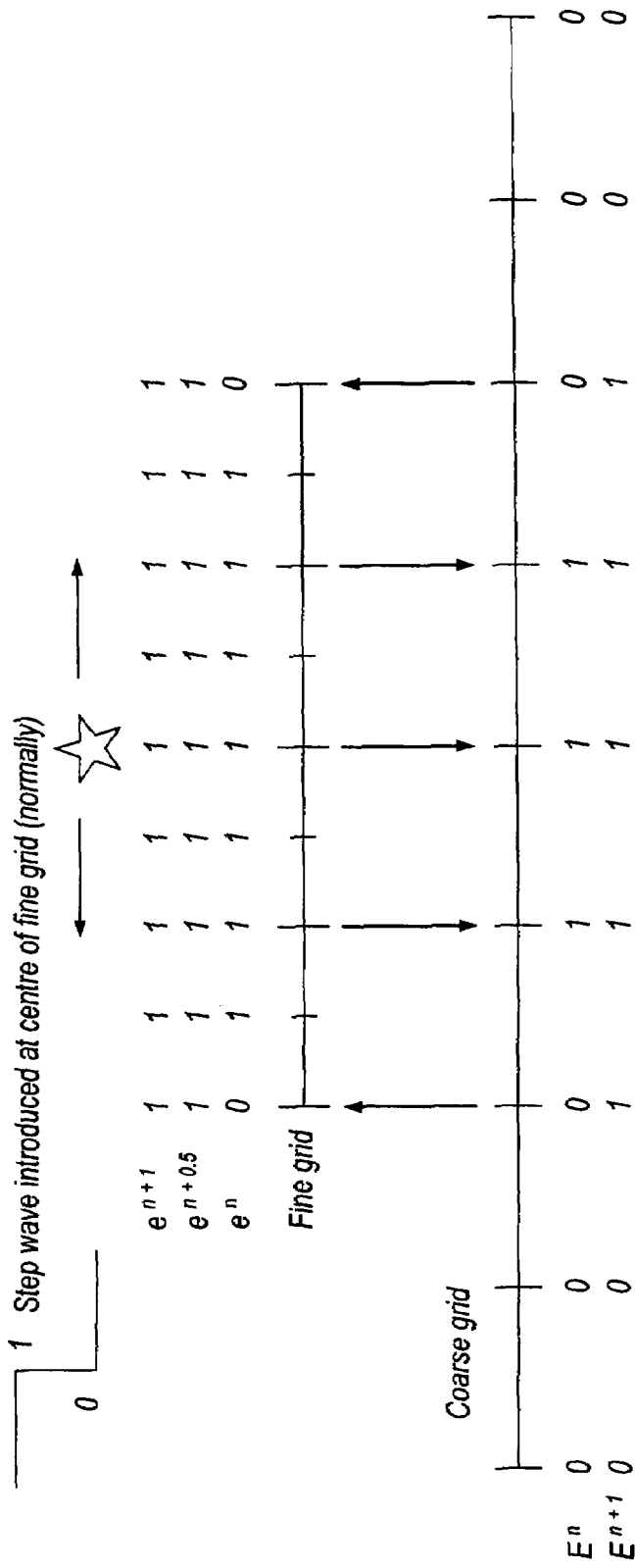

In FIGS. 12A and 12B, a step wave enters a fine grid at the left coarse grid/fine grid boundary (FIG. 12A) and exits at the right coarse grid/fine grid boundary (FIG. 12B). No excitation source is introduced at the fine grid and the solutions at the boundaries calculated by linear temporal interpolation are equal to the propagation values. FIGS. 12C and 12D, however, illustrate the effect of introducing a step wave (excitation source) at the centre of the fine grid. As the step wave propagates towards the boundaries, disagreement arises between the interpolated intermediate values ($e^{n+0.5}=0.5*(E^n+E^{n+1})=0.5$) and the fine-grid propagated value ($e^{n+0.5}=1$), resulting in artificial temporal reflection. However, if the same numerical method is used for both excitation source introduction and temporal interpolation, there will be no difference in the values and hence no reflection. For example, using linear interpolation for source values, $e\_source^{n+0.5}=0.5*(E\_Source^n+E\_Source^{n+1})$ results in no reflection.

Although the explanation above has been given using linear temporal interpolation, there is no reason why other interpolation schemes, e.g. quadratic schemes, cannot be used, provided the same scheme is used for both. In particular, the higher order the scheme used, the better approximation to the excitation source.

It should be appreciated that the various aspects of the present invention may be used alone or in combination in a single embodiment.

The invention claimed is:

1. A computer-implemented method for obtaining a numerical approximation of a physical system to be simulated for assessing wave propagation arising in that physical system, the method comprising:

creating, using a computer, a computational domain comprising a coarse-grid, which includes a plurality of coarse-grid cells, and a primary level fine-grid region comprising two or more neighboring primary level fine-grids having a plurality of primary level fine-grid cells of spatial refinement integer k, wherein the spatial refinement has an associated temporal refinement, embedding, using the computer, each primary level fine grid within one or more coarse grid cells, obtaining, using the computer, values representing a first physical quantity of the physical system to be simulated, from one or more solution points of each of the coarse-grid cells and the fine-grid cells, performing, using the computer, a calculation procedure to obtain a value representing a second physical quantity for at least one solution point of every cell at a given stage in time, and obtaining, using the computer, new values of the two physical quantities at the primary level fine-grid cell solution points at an interface between the coarse-grid and the primary level fine-grid which interface is common to neighboring fine-grids, from previous values of the two physical quantities at primary level fine-grid cell solution points adjacent to that common interface.

2. The method as claimed in claim 1, wherein the computational domain comprises a Cartesian-type grid.

3. The method as claimed in claim 1, wherein, during the calculation procedure, values of the physical quantities are determined at the perimeter of the primary level fine-grid region by means of spatial and temporal interpolation of values of the physical quantities at the coarse grid cell solution points, using spatial and temporal refinements.

4. The method as claimed in claim 1, wherein the primary level fine-grid region has at least one secondary level fine-grid region embedded within one or more of the primary level fine-grid cells, wherein the secondary level fine-grid region comprises at least two neighboring secondary level fine-grids having a plurality of secondary level fine-grid cells having a spatial refinement integer I where I>k.

5. The method as claimed in claim 4, wherein, during the calculation procedure, new values of the two physical quantities at secondary level fine-grid cell solution points at an interface between the primary level fine-grid and the secondary level fine-grid which interface is common to neighboring secondary level fine-grids are obtained from previous values of the two physical quantities at secondary level fine-grid cell solution points adjacent to that common interface.

6. The method as claimed in claim 4, wherein, during the calculation procedure, values of the physical quantities are determined at the perimeter of the secondary level fine-grid region by means of spatial and temporal interpolation of values of the physical quantities at the primary level fine-grid cell solution points.

7. The method as claimed in claim 1, wherein the primary level fine-grid region and/or the secondary level fine-grid region are/is positioned within the computational domain so as to map inhomogeneities arising in the system to be stimulated.

8. The method as claimed in claim 1, wherein the primary level fine-grid region and/or the secondary level fine-grid region are/is non-regular in shape.

9. The method as claimed in claim 1 employed for the numerical approximation of an electromagnetic field based on a Finite-Difference Time-Domain (FD-TD) method, wherein each of the coarse-grid cells and each of the fine-grid cells hold an arrangement of solution points for the electromagnetic field in which the solution points for the electric field ($\vec{E}$) are staggered orthogonally with respect to the solution points of the magnetic field ($\vec{H}$), wherein a calculation procedure is performed to obtain solutions for the electric and magnetic fields using the FD-TD updating equations which define a new value of an A-field component (where A=E or H) at a given instant in time and point in space in relation to a gradient term of the B-field (where B=H or E respectively) at the A-field point in space, the gradient term being approximated by the difference between the B-field value on one side of the A-field point in space and the B-field value on an opposite side of the A-field point in space.

10. The method as claimed in claim 9, wherein the gradient term required to update an A-field component at a coarse grid cell solution point adjacent to a co-located edge at which primary level fine-grid cell solution points exist on the coarse-grid, is calculated from the summation of all the primary level fine-grid B-field values at the primary level fine-grid cell solution points on the co-located edge.

11. The method as claimed in claim 10, wherein the required B-field gradient in a component direction g between spatial position (g+1) and (g) is approximated by:

$$B_{g+1} - B_g = \frac{\sum_{i=1}^{f}(B_{g+1} \cdot S_{g+1} \cdot \hat{n})_i}{V} - \frac{\sum_{i=1}^{f}(B_g \cdot S_g \cdot \hat{n})_i}{V}$$

where f denotes the number of B-field primary level fine-grid cell solution points to be used in the determination of the gradient term which are defined at a coordinate position (g+1) or (g) respectively, S denotes the surface area over which each primary level fine-grid cell solution point is defined in a direction orthogonal to the component direction g, n̂ denotes the unit normal vector and V denotes the cell volume of the coarse grid cell.

12. The method as claimed in claim 11 wherein, during the calculation procedure, a numerical scheme used for obtaining temporal interpolations at the perimeter of the primary level fine-grid region is also used to find solutions for an excitation source introduced at the fine-grid region.

13. The method as claimed in claim 9, when appended to claim 4, 5, or 6, wherein the gradient term required to update an A-field component at a primary level fine-grid cell solution point adjacent to a co-located edge at which secondary level fine-grid cell solution points exist on the primary level fine-grid, is calculated from the summation of all the secondary level fine-grid B-field values at the secondary level fine-grid cell solution points on the co-located edge.

14. An apparatus for obtaining a numerical approximation of a physical system to be simulated for assessing wave propagation arising in that physical system, the apparatus comprising:
  i) a computer with at least on processor and a memory to store a program of instructions;
  ii) a module creating a computational domain comprising a coarse-grid, having a plurality of coarse-grid cells, and a primary level fine-grid region comprising at least two neighboring primary level fine-grids having a plurality of primary level fine-grid cells of spatial refinement integer k, wherein the spatial refinement has an associated temporal refinement, wherein the module embeds each primary level fine grid within one or more coarse grid cells, and wherein each of the coarse-grid cells and fine-grid cells holds one or more solution points at which values representing a first physical quantity of the physical system to be simulated is obtained;
  iii) a module performing a calculation procedure to obtain a value representing a second physical quantity for at least one solution point of every cell at a given stage in time; and
  iv) a module generating new values of the two physical quantities at primary level fine-grid cell solution points at an interface between the coarse-grid and the primary level fine-grid which interface is common to neighboring fine-grids, from previous values of the two physical quantities at primary level fine-grid cell solution points adjacent to that common interface.

15. The apparatus as claimed in claim 14, wherein the domain comprises a Cartesian-type grid.

16. The apparatus as claimed in claim 14, wherein the primary level fine-grid region has at least one secondary level fine-grid region embedded within one or more of the primary level fine-grid cells, wherein the secondary level fine-grid region comprises at least two neighboring secondary level fine-grids having a plurality of secondary level fine-grid cells having a refinement integer I where I>k.

17. The apparatus as claimed in claim 16, wherein, during the calculation procedure, new values at secondary level fine-grid cell solution points at an interface between the primary level fine-grid and the secondary level fine-grid which is common to neighboring secondary level fine-grids are obtained from previous values at secondary level fine-grid cell solution points adjacent to that common interface.

18. The apparatus as claimed in claim 16, wherein, during the calculation procedure, values of the physical quantities are determined at the perimeter of the secondary level fine-grid region by means of spatial and temporal interpolation of values of the physical quantities at the primary level fine-grid cell solution points.

19. The apparatus as claimed in claim 14, wherein the primary level fine-grid region and/or the secondary level fine grid region are/is positioned within the computational domain so as to map inhomogeneities arising in the system to be stimulated.

20. The apparatus as claimed in claim 14, wherein, the primary level fine-grid region and/or the secondary level fine-grid region are/is non-regular in shape.

21. The apparatus as claimed in claim 14, wherein, during the calculation procedure, values of the physical quantities are determined at the perimeter of the primary level fine-grid region by means of spatial and temporal interpolation of values of the physical quantities at the coarse grid cell solution points, using spatial and temporal refinements.

22. A computer implemented method for simulating an electromagnetic field based on a Finite-Difference Time-Domain (FD-TD) method, the method comprising:
  creating, using a computer, a computational domain comprising a coarse grid, which includes a plurality of coarse-grid cells, and at least one primary level fine-grid of spatial refinement integer k, the spatial refinement having an associated temporal refinement, each primary level fine grid being embedded within one or more coarse grid cells, the primary level fine-grid having a plurality of primary level fine-grid cells, each of the coarse-grid cells and fine-grid cells having an arrangement of solution points for the electromagnetic field in which the solution points for the electric field ($\vec{E}$) are staggered with respect to the solution points of the magnetic field ($\vec{H}$),
  performing, using the computer, a calculation procedure to obtain solutions for the electric and magnetic fields using the FD-TD updating equations which define a new value of an A-field component (where A=E or H) at a given instant in time and position in space in relation to a gradient term of the B-field (where B=H or L respectively) at the A-field point in space,
  approximating, using the computer, the gradient term by the difference between the B-field value on one side of the A-field point in space and the B-field value on an opposite side of the A-field point in space, and
  calculating, using the computer, and using a summation of all the fine-grid B-field values at the fine-grid cell solution points on the co-located edge, the gradient term required to update the coarse-grid for an A-field component at a coarse-grid cell solution point adjacent to a co-located edge at which primary level fine-grid cell solution points exist on the coarse-grid.

23. The method as claimed in claim 22, wherein the required B-field gradient in a component direction g between spatial position (g+1) and (g) is approximated by:

$$B_{g+1} - B_g = \frac{\sum_{i=1}^{f}(B_{g+1} \cdot S_{g+1} \cdot \hat{n})_i}{V} - \frac{\sum_{i=1}^{f}(B_g \cdot S_g \cdot \hat{n})_i}{V}$$

where f denotes the number of B-field fine-grid cell solution points to be used in the determination of the gradient term which are defined at a coordinate position (g+1) or (g) respectively, S denotes the surface area over which each fine-grid cell solution point is defined in a direction orthogonal to the component direction g, $\hat{n}$ denotes the unit normal vector and V denotes the cell volume of the coarse grid cell.

24. The method as claimed in claim 22, wherein the coarse-grid comprises a primary level fine-grid region comprising at least two neighboring primary level fine-grids and wherein, during the calculation procedure, new values at primary level fine-grid cell solution points at an interface between the coarse-grid and the primary level fine-grid which interface is common to neighboring fine-grids are obtained from previous values at primary level fine-grid cell solution points adjacent to that common interface.

25. The method as claimed in claim 24, wherein the primary level fine-grid region is positioned within the domain so as to map inhomogeneities arising in the system to be simulated.

26. The method as claimed in claim 24, wherein the primary level fine-grid region is non-regular in shape.

27. The method as claimed in claim 24, wherein, during the calculation procedure, values of the physical quantities are determined at the perimeter of the primary level fine-grid region by means of spatial and temporal interpolation of values of the physical quantities at the coarse grid cell solution points, using spatial and temporal refinements.

28. The method as claimed in claim 27, wherein, during the calculation procedure, a numerical scheme used for obtaining temporal interpolations at the perimeter of the primary level fine-grid region is also used to find solutions for an excitation source introduced at the fine-grid region.

29. The method as claimed in claim 22, wherein at least one of the primary level fine-grids has at least one secondary level fine-grid embedded within one or more of the primary fine-grid cells the secondary level fine-grid having a refinement integer l where l>k, wherein the gradient term required to update the primary-level fine-grid for an A-field component at a primary-level fine-grid cell solution point adjacent to a co-located edge at which secondary level fine-grid cell solution points exist on the primary level fine-grid, is calculated from the summation of all the secondary level fine-grid B-field values at the secondary level fine-grid cell solution points on the co-located edge.

30. The method as claimed in claim 29, wherein the primary level fine-grid comprises a secondary level fine-grid region comprising at least two neighboring secondary level fine-grids and wherein, during the calculation procedure, new values at secondary level fine-grid cell solution points at an interface between the primary level fine-grid and the secondary level fine-grid which interface is common to neighboring secondary level fine-grids are obtained from previous values at secondary level fine-grid cell solution points adjacent to that common interface.

31. The method as claimed in claim 30, wherein the secondary level fine-grid region is positioned within the domain so as to map inhomogeneities arising in the system to be simulated.

32. The method as claimed in claim 22, wherein the domain comprises a Cartesian-type grid.

33. An apparatus for simulating an electromagnetic field based on a Finite-Difference Time-Domain (FD-TD) method, the apparatus comprising:
  i) a computer with at least on processor and a memory to store a program of instructions;
  ii) a module creating a computational domain comprising a coarse-grid, having a plurality of coarse-grid cells, and at least one primary level fine-grid of spatial refinement integer k, wherein the spatial refinement has an associated temporal refinement, wherein the module embeds each primary level fine grid within one or more coarse grid cells, the primary level fine-grid having a plurality of primary level fine-grid cells, each of the coarse-grid cells and fine-grid cells having an arrangement of solution points for the electromagnetic field in which the solution points for the electric field ($\vec{E}$) are staggered with respect to the solution points of the magnetic field ($\vec{H}$) and wherein the refinement includes spatial refinement and temporal refinement, and
  iii) a module performing a calculation procedure to obtain solutions for the electric and magnetic fields, the calculation procedure using the FD-TD updating equations which define a new value of an A-field component (where A=L or H) at a given instant in time and position in space in relation to a gradient term of the B-field (where B=H or L respectively) at the A-field point in space, the gradient term being approximated by the difference between the B-field value on one side of the A-field point in space and the B-field value on an opposite side of the A-field point in space, wherein the gradient term required to update the coarse-grid for an A-field component at a coarse-grid cell solution point adjacent to a co-located edge at which primary level fine-grid cell solution points exist on the coarse-grid, is calculated using a summation of all the fine-grid B-field values at the fine-grid cell solution points on the co-located edge.

34. The apparatus as claimed in claim 33, wherein the required B-field gradient in a component direction g between spatial position (g+1) and (g) is approximated by:

$$B_{g+1} - B_g = \frac{\sum_{i=1}^{f}(B_{g+1} \cdot S_{g+1} \cdot \hat{n})_i}{V} - \frac{\sum_{i=1}^{f}(B_g \cdot S_g \cdot \hat{n})_i}{V}$$

where f denotes the number of B-field fine-grid cell solution points to be used in the determination of the gradient term which are defined at a coordinate position (g+1) or (g) respectively, S denotes the surface area over which each fine-grid cell solution point is defined in a direction orthogonal to the component direction g, $\hat{n}$ denotes the unit normal vector and V denotes the cell volume of the coarse grid cell.

35. The apparatus as claimed in claim 33, wherein the domain comprises a primary level fine-grid region comprising at least two neighboring primary level fine-grids and wherein, during the calculation procedure, new values at primary level fine-grid cell solution points at an interface between the coarse-grid and the primary level fine-grid which interface is common to neighboring fine-grids are obtained from previous values at primary level fine-grid cell solution points adjacent to that common interface.

36. The apparatus as claimed in claim 35, wherein the primary level fine-grid region is positioned within the domain so as to map inhomogeneities arising in the system to be stimulated.

37. The apparatus as claimed in claim 35, wherein the primary level fine-grid region is non-regular in shape.

38. The apparatus as claimed in claim 33, wherein at least one of the primary level fine-grids has at least one secondary level fine-grid embedded within one or more of the primary fine-grid cells, the secondary level fine-grid having a refinement integer I where I>k, wherein the gradient term required to update the primary-level fine-grid for an A-field component at a primary level fine-grid cell solution point adjacent to a co-located edge at which secondary level fine-grid cell solution points exist on the primary level fine-grid, is calculated from the summation of all the secondary level fine-grid B-field values at the secondary level fine-grid cell solution points on the co-located edge.

39. The apparatus as claimed in claim 38, wherein the primary level fine-grid comprises a secondary level fine-grid region comprising at least two neighboring secondary level fine-grids and wherein, during the calculation procedure, new values at secondary level fine-grid cell solution points at an interface between the primary level fine-grid and the secondary level fine-grid which is common to neighboring secondary level fine-grids are obtained from previous values at secondary level fine-grid cell solution points adjacent to that common interface.

40. A computer readable storage medium for controlling a computer having a computer program which, when run on the computer, causes the computer to perform the method as claimed in claim 1.

* * * * *

UNITED STATES PATENT AND TRADEMARK OFFICE
CERTIFICATE OF CORRECTION

PATENT NO.        : 7,620,536 B2                                         Page 1 of 1
APPLICATION NO.   : 11/181804
DATED             : November 17, 2009
INVENTOR(S)       : Peter Chow It is certified that error appears in the above-identified patent and that said Letters Patent is hereby corrected as shown below:

Column 24, Line 55, change "L" to --E--.

Column 26, Line 30, change "A=L" to --A=E--.

Column 26, Line 32, change "L" to --E--.

Signed and Sealed this

Twenty-sixth Day of January, 2010

David J. Kappos
*Director of the United States Patent and Trademark Office*